(12) United States Patent
Keating et al.

(10) Patent No.: US 12,690,572 B2
(45) Date of Patent: Jul. 28, 2026

(54) QUICK SWAPPABLE FISHING JIG

(71) Applicant: Blitz Performance LLC, Long Beach Township, NJ (US)

(72) Inventors: John Wyatt Keating, Long Beach Township, NJ (US); Stelios Christos Melekos, Southampton, PA (US)

(73) Assignee: STACK TACKLE, LLC, East Stroudsburg, PA (US)

( * ) Notice: Subject to any disclaimer, the term of this patent is extended or adjusted under 35 U.S.C. 154(b) by 0 days.

(21) Appl. No.: 18/767,441

(22) Filed: Jul. 9, 2024

(65) Prior Publication Data

US 2025/0241281 A1     Jul. 31, 2025

Related U.S. Application Data

(60) Provisional application No. 63/627,427, filed on Jan. 31, 2024.

(51) Int. Cl.
| | |
|---|---|
| *A01K 85/00* | (2006.01) |
| *A01K 83/06* | (2006.01) |
| *A01K 85/18* | (2006.01) |

(52) U.S. Cl.
CPC ........... *A01K 85/029* (2022.02); *A01K 83/06* (2013.01); *A01K 83/064* (2022.02); *A01K 85/18* (2013.01); *A01K 85/1833* (2022.02); *A01K 85/1837* (2022.02); *A01K 85/1841* (2022.02)

(58) Field of Classification Search
CPC ...... A01K 85/00; A01K 85/029; A01K 85/18;
A01K 85/1811; A01K 85/1821; A01K 85/1823; A01K 85/1833; A01K 85/1837; A01K 85/1841; A01K 83/06; A01K 83/064
USPC ........... 43/42.09, 42.39, 42.22, 42.24, 42.28, 43/44.81, 44.2, 44.8
See application file for complete search history.

(56) References Cited

U.S. PATENT DOCUMENTS

| | | | | |
|---|---|---|---|---|
| 83,681 | A | * | 11/1868 | Albee .................... A01K 85/00 43/44.81 |
| 148,926 | A | * | 3/1874 | Cahoon .................. A01K 85/00 43/44.81 |
| 1,264,658 | A | * | 4/1918 | King ...................... A01K 85/16 43/42.28 |

(Continued)

FOREIGN PATENT DOCUMENTS

| | | | | | |
|---|---|---|---|---|---|
| CA | 2765297 | A1 | * | 4/2013 | ............. A01K 85/00 |
| DE | 202020001033 | U1 | * | 7/2020 | |

(Continued)

*Primary Examiner* — Darren W Ark
(74) *Attorney, Agent, or Firm* — Neo IP

(57) ABSTRACT

A fishing jig that allows for efficient adaptability, enabling swift transitions between different styles and weights of jig heads without the need for laborious retying. The jig incorporates a screw-on/off mechanism that facilitates the rapid and secure interchangeability of jig heads, eliminating the downtime associated with traditional methods. This expedited swapping capability not only optimizes time spent on the water but also ensures an uninterrupted pursuit of the most suitable bait for the prevailing fishing conditions. Moreover, the jig's user-friendly quick-swap feature accommodates individuals with limited dexterity, enhancing accessibility for a broader range of anglers.

16 Claims, 10 Drawing Sheets

(56) References Cited

U.S. PATENT DOCUMENTS

| | | | | | |
|---|---|---|---|---|---|
| 1,454,820 A | * | 5/1923 | Readle | A01K 85/00 | 43/42.28 |
| 1,472,638 A | * | 10/1923 | Dickman | A01K 85/16 | 43/42.36 |
| 1,710,102 A | * | 4/1929 | Moore | A01K 85/10 | 43/42.48 |
| 2,307,200 A | * | 1/1943 | Cullerton | A01K 85/16 | 43/42.49 |
| 2,465,064 A | * | 3/1949 | Colosimo | A01K 85/16 | 43/42.34 |
| 2,467,971 A | * | 4/1949 | Frair | A01K 83/06 | 43/42.22 |
| 2,546,772 A | * | 3/1951 | Neff | A01K 85/16 | 43/42.09 |
| 2,989,817 A | * | 6/1961 | Kepler | A01K 83/00 | D22/144 |
| 3,009,279 A | * | 11/1961 | Jacobson | A01K 85/18 | 43/42.15 |
| 3,040,462 A | * | 6/1962 | Guida | A01K 85/01 | 43/42.31 |
| 3,069,801 A | * | 12/1962 | Mills | A01K 85/16 | 43/42.39 |
| 3,091,885 A | * | 6/1963 | Ulsh | A01K 85/00 | 43/43.12 |
| 3,359,674 A | * | 12/1967 | Strumor | A01K 85/18 | 43/42.22 |
| 3,423,868 A | * | 1/1969 | Le Master | A01K 85/18 | 43/42.35 |
| 3,504,454 A | * | 4/1970 | Turbeville | A01K 85/00 | 43/42.49 |
| 3,505,754 A | * | 4/1970 | Lawlor | A01K 85/16 | 43/42.22 |
| 3,608,228 A | * | 9/1971 | Borresen et al. | A01K 85/01 | 43/42.22 |
| 3,708,903 A | * | 1/1973 | Bercz | A01K 85/01 | 43/42.46 |
| 3,750,323 A | * | 8/1973 | Weis | A01K 85/00 | D22/128 |
| 3,864,863 A | * | 2/1975 | Neal | A01K 85/00 | 43/42.15 |
| 3,897,647 A | * | 8/1975 | Black | A01K 85/00 | 403/41 |
| 3,916,556 A | * | 11/1975 | Armanno | A01K 85/16 | 43/42.22 |
| 3,947,989 A | * | 4/1976 | Bart | A01K 85/16 | 43/42.22 |
| 4,030,225 A | * | 6/1977 | Earley | A01K 91/04 | 43/42.49 |
| 4,054,004 A | * | 10/1977 | Schott | A01K 85/02 | 43/42.31 |
| 4,530,180 A | * | 7/1985 | Gwaldacz, Sr. | A01K 85/00 | 43/44.81 |
| 4,619,067 A | * | 10/1986 | West | A01K 85/00 | 43/42.36 |
| 4,638,584 A | * | 1/1987 | Lindsay | A01K 85/01 | 43/42.31 |
| 4,777,757 A | * | 10/1988 | de Marees van Swinderen | A01K 85/01 | D22/128 |
| 4,777,758 A | * | 10/1988 | Phillips | A01K 85/02 | 43/43.2 |
| 4,811,513 A | * | 3/1989 | Grobl | A01K 85/01 | 43/17.6 |
| 4,831,768 A | * | 5/1989 | Sorace | A01K 85/00 | 43/42.05 |
| 4,831,770 A | * | 5/1989 | Dworski | A01K 85/00 | D22/128 |
| 4,841,665 A | * | 6/1989 | McGahee | A01K 85/00 | 43/42.24 |
| 5,025,586 A | * | 6/1991 | Pixton | A01K 85/00 | 43/42.39 |
| 5,036,617 A | * | 8/1991 | Waldrip | A01K 85/01 | 43/42.31 |
| 5,070,639 A | * | 12/1991 | Pippert | A01K 85/01 | 43/42.31 |
| 5,105,575 A | * | 4/1992 | Robertaccio | A01K 85/00 | 43/44.8 |
| 5,129,175 A | * | 7/1992 | Pixton | A01K 85/00 | 43/42.24 |
| 5,182,876 A | * | 2/1993 | Lewis | A01K 85/00 | 43/42.39 |
| 5,222,321 A | * | 6/1993 | Lu | A01K 85/00 | 43/44.81 |
| 5,331,762 A | * | 7/1994 | Banks | A01K 85/16 | 43/42.22 |
| 5,369,906 A | * | 12/1994 | Anterni | A01K 85/16 | 43/42.48 |
| 5,537,775 A | * | 7/1996 | Crumrine | A01K 85/00 | 43/42.38 |
| 5,673,508 A | * | 10/1997 | Snyder | A01K 83/00 | 43/44.8 |
| 5,899,015 A | * | 5/1999 | Link | A01K 85/00 | 43/42.39 |
| 5,992,083 A | * | 11/1999 | Deng | A01K 85/16 | 43/42.15 |
| 6,173,521 B1 | * | 1/2001 | Rockhill, Jr. | A01K 85/00 | 43/42.13 |
| 6,233,863 B1 | * | 5/2001 | Dotson | A01K 85/00 | 43/42.38 |
| 6,357,167 B1 | * | 3/2002 | Bradford | A01K 85/00 | 43/42.31 |
| 6,601,336 B1 | * | 8/2003 | Link | A01K 85/00 | 43/42.11 |
| 6,898,894 B1 | * | 5/2005 | Anderson | A01K 85/00 | 43/42.39 |
| 7,107,719 B1 | * | 9/2006 | Scott | A01K 85/00 | 43/42.26 |
| 7,562,489 B2 | * | 7/2009 | Turner | A01K 85/01 | 43/42.22 |
| 7,827,731 B2 | | 11/2010 | Gibson | | |
| 8,186,096 B2 | * | 5/2012 | Rubin | A01K 91/04 | 43/42.49 |
| 8,365,459 B2 | * | 2/2013 | Bennis | A01K 93/00 | 43/44.87 |
| 8,402,687 B1 | * | 3/2013 | Jarrell | A01K 85/00 | 43/42.28 |
| 8,484,884 B2 | * | 7/2013 | Zuk | A01K 85/16 | 43/42.28 |
| 8,640,378 B2 | * | 2/2014 | Rye | A01K 85/01 | 43/42.32 |
| 8,713,848 B2 | * | 5/2014 | Huppert | A01K 91/053 | 43/43.15 |
| 9,003,689 B1 | * | 4/2015 | Rye | A01K 85/00 | 43/42.35 |
| 9,288,972 B1 | * | 3/2016 | Link | A01K 85/00 | |
| 9,301,514 B2 | * | 4/2016 | Pearcy | A01K 91/03 | |
| 10,104,877 B2 | | 10/2018 | Wilson | | |
| 10,123,520 B2 | * | 11/2018 | Furuya | A01K 83/00 | |
| 10,194,646 B2 | | 2/2019 | Walsh et al. | | |
| 10,244,741 B1 | * | 4/2019 | Hancock | A01K 85/16 | |
| 11,019,811 B2 | | 6/2021 | Partridge | | |
| 11,197,468 B2 | * | 12/2021 | Fenton | A01K 91/04 | |
| 11,330,808 B2 | * | 5/2022 | Plihal | A01K 85/18 | |
| 11,412,722 B1 | * | 8/2022 | Standke | A01K 83/06 | |
| 11,470,831 B1 | * | 10/2022 | Rudy | A01K 85/015 | |
| 11,484,017 B2 | * | 11/2022 | Hajjar | A01K 85/01 | |
| 11,723,351 B1 | * | 8/2023 | Gomez | A01K 85/1821 | 43/17.6 |
| 12,063,916 B2 | * | 8/2024 | Embry | A01K 85/10 | |
| 2003/0159329 A1 | | 8/2003 | Mitchell | | |
| 2004/0216360 A1 | * | 11/2004 | Holtzhampf | A01K 91/03 | 43/42.39 |
| 2005/0120613 A1 | * | 6/2005 | Pack | A01K 85/00 | 43/44.9 |
| 2006/0005459 A1 | * | 1/2006 | Lehman | A01K 83/06 | 43/42.15 |

(56) References Cited

U.S. PATENT DOCUMENTS

| | | | | |
|---|---|---|---|---|
| 2006/0042147 A1* | 3/2006 | Jenkins | A01K 85/16 | 43/42.36 |
| 2007/0271838 A1* | 11/2007 | Lowiecki | A01K 85/02 | 43/17.2 |
| 2008/0222939 A1* | 9/2008 | Smith | A01K 85/16 | 43/17.6 |
| 2009/0044441 A1* | 2/2009 | Neal | A01K 91/04 | 43/43.1 |
| 2009/0090040 A1* | 4/2009 | Kite | A01K 85/00 | 43/43.1 |
| 2011/0056113 A1* | 3/2011 | Sebile | A01K 85/01 | 43/42.49 |
| 2011/0296738 A1* | 12/2011 | Howe | A01K 85/00 | 43/42.37 |
| 2012/0000111 A1* | 1/2012 | Griffin | A01K 85/16 | 43/42.37 |
| 2012/0005946 A1* | 1/2012 | Bennis | A01K 85/00 | 43/44.87 |
| 2012/0079757 A1* | 4/2012 | Rye | A01K 85/01 | 43/42.32 |
| 2013/0227874 A1* | 9/2013 | Dugan | A01K 85/01 | 43/26.2 |
| 2014/0144063 A1 | 5/2014 | Hamilton, Jr. | | |
| 2014/0311011 A1* | 10/2014 | Guntharp | A01K 85/12 | 43/42.2 |
| 2015/0000176 A1* | 1/2015 | Pettet | A01K 85/01 | 43/17.6 |
| 2016/0081316 A1* | 3/2016 | Madala | A01K 83/00 | 43/42.06 |
| 2016/0165868 A1* | 6/2016 | LeHew | A01K 85/00 | 43/42.74 |
| 2017/0000097 A1* | 1/2017 | Thomas | A01K 85/01 | |
| 2019/0014761 A1* | 1/2019 | Rosher | A01K 85/18 | |
| 2019/0313616 A1* | 10/2019 | Aguilar | A01K 85/01 | |
| 2021/0037800 A1* | 2/2021 | Plihal | A01K 85/18 | |
| 2022/0132820 A1* | 5/2022 | Willey | A01K 95/00 | 43/42.39 |
| 2022/0151209 A1* | 5/2022 | Branum | A01K 85/00 | |
| 2023/0301283 A1* | 9/2023 | Renosky | A01K 85/18 | |
| 2025/0017185 A1* | 1/2025 | Rosher | A01K 85/024 | |

FOREIGN PATENT DOCUMENTS

| | | | | |
|---|---|---|---|---|
| EP | 2907382 A1 * | 8/2015 | | A01K 85/16 |
| EP | 3281522 A1 * | 2/2018 | | |
| FR | 3088802 A1 * | 5/2020 | | A01K 85/00 |
| GB | 2415348 A * | 12/2005 | | A01K 85/01 |
| GB | 2448286 A * | 10/2008 | | A01K 85/08 |
| GB | 2547185 A * | 8/2017 | | A01K 85/00 |
| JP | 2008054539 A * | 3/2008 | | |
| JP | 2011030471 A * | 2/2011 | | |
| JP | 2012050336 A * | 3/2012 | | |
| JP | 2012080861 A * | 4/2012 | | |
| JP | 2014193129 A * | 10/2014 | | A01K 83/02 |
| JP | 2014217334 A * | 11/2014 | | |
| JP | 2016002006 A * | 1/2016 | | |
| JP | 2018050485 A * | 4/2018 | | |
| JP | 2018161111 A * | 10/2018 | | |
| JP | 2021016354 A * | 2/2021 | | |
| KR | 100593260 B1 * | 6/2006 | | |
| KR | 100848700 B1 * | 7/2008 | | |
| KR | 20100049391 A * | 5/2010 | | |
| KR | 20190002463 U * | 10/2019 | | A01K 91/04 |
| KR | 20240076710 A * | 5/2024 | | |
| WO | WO-2010131036 A1 * | 11/2010 | | A01K 85/00 |
| WO | WO-2015112161 A1 * | 7/2015 | | A01K 85/00 |
| WO | WO-2015164908 A1 * | 11/2015 | | A01K 85/00 |
| WO | WO-2016007643 A1 * | 1/2016 | | A01K 85/00 |
| WO | WO-2018104837 A1 * | 6/2018 | | A01K 85/00 |

* cited by examiner

QUICK SWAPPABLE FISHING JIG

CROSS REFERENCES TO RELATED APPLICATIONS

This application claims priority to and the benefit of U.S. Provisional Application No. 63/627,427, filed Jan. 31, 2024, which is incorporated herein by reference in its entirety.

BACKGROUND OF THE INVENTION

1. Field of the Invention

The present invention relates to a fishing lure, and more specifically to a fishing jig with an interchangeable jig head including a screw off/on mechanism.

2. Description of the Prior Art

It is generally known in the prior art to provide customizable fishing lures and jigs.

Prior art patent documents include the following:

US Patent Pub. No. 2014/0144063 for Interchangeable Bait Head And System For Artificial Bait by inventor Hamilton Jr., filed on Nov. 27, 2013 and published on May 29, 2014, discloses a fishing lure for fishing in a body of water including a head having a proximate end and a distal end, the head having a chamber therein communicating with an opening in its distal end and a hook through the proximate end of the head. A hook extends through the chamber from the proximate end of the head and through the opening of the distal end. The hook has an eye for connecting to a fishing line. Artificial bait is disposed on the hook and extends into the chamber in the head. The head is shaped for imparting oscillating side-to-side movement to the head relative to the bait and hook as the lure moves through water.

US Patent Pub. No. 2012/0005946 for Eco-Friendly, Lead-Free, Replaceable Jig Head System by inventor Bennis, filed on May 18, 2010 and published on Jan. 12, 2012 discloses a modular fishing hook accessory mounting system for removably mounting a fishing accessory on a hook. The system includes a hook, a modular mounting member, and a fishing accessory. The hook has a shank portion and an eye shank portion, the eye shank portion being located at one end of the shank portion. The modular mounting member is mounted on the hook for removably receiving a fishing accessory. The fishing accessory is removably mounted on the modular mounting member, the fishing accessory having a recess formed therein for slidably receiving at least a portion of a retaining member for retaining the retaining member and fishing accessory to the mounting member. The fishing accessory may be a jig head that is substantially lead-free, such as being made from a steel that has been powdered, pressed, and sintered. Of course, the modular fishing hook accessory mounting system will work with a lead jig head that is modified to be removable.

US Patent Pub. No. 2003/0159329 for Pivoting jig head and hook combination by inventor Mitchell, filed on Feb. 28, 2003 and published on Aug. 28, 2003 discloses a pivoting jig head and hook combination for fishing. The combination functions as an action-producing lure wherein the intimacy between the tail portion of the plastic lure body and the rear portion of hook stabilizes the position of the jig head on the shank along with forward motion of the combination as it is pulled through water. The pivot ability of the jig head provides additional action to the tail portion of the plastic lure body. The jig head may be dynamically formed to produce a variety of side-to-side actions when pulled forward through the water. As the combination has two components, the rattling or vibrations created during the combination's forward motion, this also develops a desirable sonic attraction.

U.S. Pat. No. 7,827,731 for Weighted fishing lure having interchangeable lure body by inventor Gibson, filed on Apr. 29, 2008 and issued on Nov. 9, 2010, discloses a fishing lure having a reusable and interchangeable lure body. The lure body can be changed without having to cut and retie the fishing line to the fishing lure. The fishing lure has two separate components that can be interchanged: the weighted hook and the lure body. A fishing line can be tied to the weighted hook. Different lure bodies can be affixed to the weighted hook to be fished.

U.S. Pat. No. 6,898,894 for Fishing jig with interchangeable jig head by inventor Anderson, filed on Jan. 15, 2003 and issued on May 31, 2005 discloses a fishing jig system with an interchangeable jig head for permitting a variety of jig heads with different configurations and functions to be used with a single jig hook and avoid having to remove the jig hook from a fishing line to reconfigure the fishing jig. The jig system includes a hook having a shank portion and an eye portion, with the shank portion and the eye portion meeting at a juncture. A modular mounting member is mounted on the hook at the juncture for removably receiving a fishing accessory. A fishing accessory, such as a jig head, is removably mounted on the modular mounting member, and the fishing accessory has a recess formed therein for slidably receiving at least a portion of the modular mounting member such that the accessory may be removed and replaced without removing the jig hook from the fishing line.

U.S. Pat. No. 11,019,811 for Fishing lure by inventor Partridge, filed on Mar. 2, 2010 and issued on Jun. 1, 2021, discloses an artificial fishing lure that has a sleeve extending over the lure to create a water-resistant cavity. Wherein the sleeve is made to elastically constrict around at least the head to hold the sleeve thereto. The sleeve may have a diving lip mounted to the front to regulate the depth of the lure while being pulled through the water. The sleeve may have at least one appendage mounted thereto. The cavity may be used to place fish scent attractant material, weights, air, or other desirable material therein. At least one hole may be mounted through the circumscribing wall in a location juxtaposing the cavity. The sleeve may also contain at least one partition positioned in the cavity.

U.S. Pat. No. 10,194,646 for Modular chambered leader fishing lure by inventors Walsh et al., filed on Apr. 9, 2015 and issued on Feb. 5, 2019, discloses a modular chambered fishing lure having an internal spool for providing compact storage for an extendable leader; weighted elements removably attached along various portions of the lure body for providing a desired motion, orientation, and depth in the water; and a plurality of interchangeable tail components to provide a variety of different lure types.

U.S. Pat. No. 10,104,877 for Expanding or contracting fishing lure by inventor Wilson, filed on Nov. 2, 2016 and issued on Oct. 23, 2018, discloses fishing lures, and more specifically, an expanding or contracting fishing lure that provides a natural movement that mimics live bait. The fishing lure is configured so that when the fishing lure is retrieved (e.g., reeled in) or jigged by an angler, or the fishing line is pulled or twitched, the fishing lure transitions from a first position to a second position and then returns to the first position. The purpose of the invention is to provide a fishing lure that will successfully attract fish by displaying a unique action in the water.

SUMMARY OF THE INVENTION

The present invention relates to a fishing lure, and more specifically to a fishing jig with an interchangeable jig head including a screw off/on mechanism.

It is an object of this invention to provide a modular quick and easy to use lure system that allows a fisherman to quickly change his jig/weight without retying the line.

In one embodiment, the present invention includes a modular fishing jig, including a jig head, a hook tail, and a rubber ring, wherein the hook tail includes a threaded attachment post, wherein the jig head includes a threaded post receptacle and wherein threads of the threaded post receptacle complement threads of the threaded attachment post to provide for frictional engagement of the jig head with the hook tail, wherein the rubber ring is secured at a base of the threaded attachment post, wherein the jig head is operable to screw on and screw off of the hook tail, wherein a fishing hook protrudes from and is permanently attached to the hook tail, wherein the hook tail includes a rigid loop permanently attached to a main body of the hook tail, and wherein the rigid loop is operable to receive a fishing line, and wherein the jig head weighs between 0.5 oz and 1.5 oz.

In another embodiment, the present invention includes a modular fishing jig, including a jig head, a hook tail, and a rubber ring, wherein the rubber ring creates a waterproof seal between the jig head and the hook tail when assembled, wherein the hook tail includes a threaded attachment post and wherein the jig head includes a compatible threaded post receptacle, wherein the compatible threaded post receptacle and the threaded attachment post lock together after being rotated in a first direction, wherein the hook tail includes a fishing hook, wherein the hook tail has a rigid loop positioned at the top of a main body of the hook tail, and wherein the jig head is operable to be unlocked and removed from the hook tail by rotating the jig head in a second direction.

In yet another embodiment, the present invention includes a system for rapidly changing a fishing jig head, including the fishing jig head, a mating tail piece, and a fishing line, wherein the mating tail piece comprises of a fishing hook and an eye operable to receive the fishing line, wherein the fishing jig head is operable to be screwed off by hand, and wherein a replacement fishing jig head is operable to be screwed on to the mating tail piece without cutting the fishing line.

These and other aspects of the present invention will become apparent to those skilled in the art after a reading of the following description of the preferred embodiment when considered with the drawings, as they support the claimed invention.

DETAILED DESCRIPTION

Figure 1:
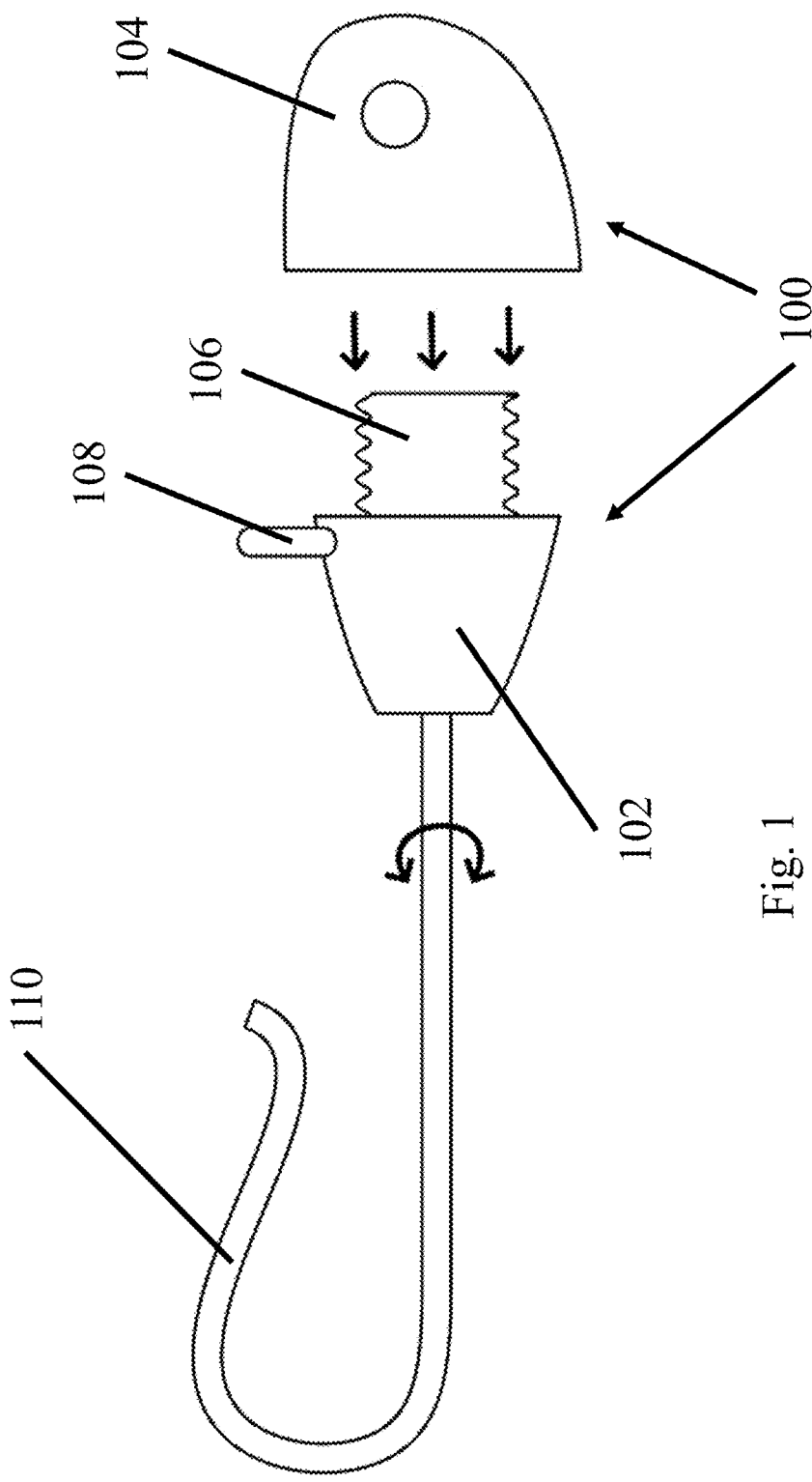
FIG. 1 illustrates a side exploded view of the fishing jig according to one embodiment of the present invention.

The present invention is generally directed to a fishing lure, and more specifically to a fishing jig with an interchangeable jig head including a screw off/on mechanism.

In one embodiment, the present invention includes a modular fishing jig, including a jig head, a hook tail, and a rubber ring, wherein the hook tail includes a threaded attachment post, wherein the jig head includes a threaded post receptacle and wherein threads of the threaded post receptacle complement threads of the threaded attachment post to provide for frictional engagement of the jig head with the hook tail, wherein the rubber ring is secured at a base of the threaded attachment post, wherein the jig head is operable to screw on and screw off of the hook tail, wherein a fishing hook protrudes from and is permanently attached to the hook tail, wherein the hook tail includes a rigid loop permanently attached to a main body of the hook tail, and wherein the rigid loop is operable to receive a fishing line, and wherein the jig head weighs between 0.5 oz and 1.5 oz.

In another embodiment, the present invention includes a modular fishing jig, including a jig head, a hook tail, and a rubber ring, wherein the rubber ring creates a waterproof seal between the jig head and the hook tail when assembled, wherein the hook tail includes a threaded attachment post and wherein the jig head includes a compatible threaded post receptacle, wherein the compatible threaded post receptacle and the threaded attachment post lock together after being rotated in a first direction, wherein the hook tail includes a fishing hook, wherein the hook tail has a rigid loop positioned at the top of a main body of the hook tail, and wherein the jig head is operable to be unlocked and removed from the hook tail by rotating the jig head in a second direction.

In yet another embodiment, the present invention includes a system for rapidly changing a fishing jig head, including the fishing jig head, a mating tail piece, and a fishing line, wherein the mating tail piece comprises of a fishing hook and an eye operable to receive the fishing line, wherein the fishing jig head is operable to be screwed off by hand, and wherein a replacement fishing jig head is operable to be screwed on to the mating tail piece without cutting the fishing line.

In the realm of recreational fishing, anglers encounter the ongoing challenge of adapting their fishing gear to diverse fishing conditions, preferences, and target species. The process of changing fishing jigs traditionally demands nimble manipulation and precise coordination, posing difficulties for anglers seeking efficient adjustments to their gear. This challenge becomes even more pronounced for those who have conditions such as arthritis, physical disabilities, or other impediments affecting hand and arm functionality.

Fishing jigs, recognized as essential tools in an angler's repertoire, often require the attachment and detachment of different variations of jigs to optimize their effectiveness for different types of fish. Conventional methods involve manually retying the jig onto the fishing line, a process that demands a level of hand strength and dexterity, potentially limiting the speed at which anglers can adapt to dynamic fishing scenarios.

The innovative fishing jig presented herein addresses these challenges by introducing an interchangeable jig head design that seamlessly enhances efficiency and modularity. This groundbreaking feature allows anglers, irrespective of their hand dexterity or strength, to effortlessly customize their fishing presentation by quickly and efficiently switching jig head styles and weights.

Traditional fishing lures typically feature fixed jig heads, requiring anglers to invest in an array of different lures to cover a spectrum of scenarios. This not only proves to be economically burdensome but also limits the adaptability of an angler's toolkit in responding to dynamic fishing environments. The present invention eliminates this complexity by incorporating a screw-off mechanism, enabling anglers to interchange jig heads swiftly and securely. This design not only simplifies the process but significantly enhances the overall efficiency of adapting fishing jigs to diverse fishing conditions.

For example, when fishermen fish in deeper seas or go after bigger fish, these situations require a heavier lure. The present invention addresses this issue by allowing the user to quickly add extra weight to the lure, allowing the user to maximize the time their bait is in the strike zone by eliminating the need to cut and retie a new lure.

While various devices for modifying fishing gear exist in the market, such as those allowing for the replacement of hooks or adding bait, none address the challenge of quickly and efficiently changing jig heads with a modular approach. The present invention distinguishes itself from existing solutions by providing a lightweight, user-friendly, and modular fishing jig that aligns with the expectations of everyday anglers. This ensures a seamless and rapid adjustment of fishing tactics, enhancing the overall fishing experience for individuals of all skill levels and physical abilities.

None of the prior art discloses a fishing jig with an interchangeable jig head including a screw-off/screw-on attachment system that allows a user to remove and change the jig head without requiring the user to retie the fishing line to the lure.

Referring now to the drawings in general, the illustrations are for the purpose of describing one or more preferred embodiments of the invention and are not intended to limit the invention thereto.

FIG. 1 illustrates a side exploded view of the fishing jig 100. In one embodiment the fishing jig 100 is comprised of two main components, the hook tail 102 and the jig head 104, connected by a threaded attachment post 106 protruding from a front end of the hook tail 102. The jig head 104 is operable to screw onto the threaded attachment post 106 via a threaded hole defined in the rear surface of the jig head 104. In another embodiment, the jig head 104 is connected by a threaded attachment post protruding from the rear end of jig head 104, which is operable to screw into a threaded hole defined in the front surface of the tail hook 102. In another embodiment, the hook tail 102 connects to the jig head 104 via a latch system for quick and easy removal and replacement while still being secure. In another embodiment, the hook tail 102 connects to the jig head 104 with a press fit connection that protrudes from the front of the hook tail 102 along with a complimentary press fit receptacle recessed into the rear of the jig head 104. This press-fit design enhances the structural integrity of the connection, providing a stable and reliable linkage between the hook tail 102 and the jig head 104. In another embodiment, the jig head 104 connects to the hook tail 102 via a snap-fit system. In one embodiment, the weight of the jig head 104 can range from 0.015625 oz increments up to 20 oz. In one embodiment, the jig head 104 can weigh from 0.015625 oz to 15 oz. In one embodiment, the jig head 104 can weigh from 0.0625 oz to 3 oz. In one embodiment, the jig head 104 can weigh from 0.5 to 1.5 oz. In one embodiment, the weight of the jig head 104 is an increment of 0.015625 oz. In one embodiment, the weight of the jig head 104 is an increment of 0.0625 oz. In one embodiment, the weight of the jig head 104 is an increment of 0.125 oz. In one embodiment, the weight of the jig head 104 is an increment of 0.25 oz. In one embodiment, the weight of the jig head 104 is an increment of 0.5 oz.

In one embodiment, the fishing jig 100 is comprised of one or more materials, including but not limited to one or more plastics, one or more metals (e.g., stainless steel, aluminum, lead, etc.), and/or fiber reinforced composite (e.g., carbon fiber, fiberglass, etc.). Preferably, the materials used provide a high strength-to-weight ratio for the fishing jig 100 for durability. In one embodiment, the material used for the fishing jig 100 includes a marine grade metal, including but not limited to, lead, carbon steel (e.g., AH36, DH36, EH36, etc.), alloy steel (e.g., of grades MD, ME, MF, MG, etc.), stainless steel (e.g., grades 316, 304, etc.), galvanized steel, aluminum (e.g., grades 5052, 5083, etc.), copper (e.g., C70600, C71500, etc.), brass (e.g., C46200, C46400, C48500, etc.), and bronze (e.g., C65500, C95400, C51000, etc.). The use of marine grade metals provides longevity for the fishing jig 100, particularly in regular use in wet outdoor conditions. In one embodiment, the plastic or fiber reinforced composite fishing jig 100 is formed from materials or a coating is applied to achieve IP67 waterproof standards. In one embodiment, the plastic or fiber reinforced composite fishing jig 100 is formed from materials which meet ASTM G154 UV resistance standards, or a coating is applied to achieve ASTM G154 UV resistance standards. However, one of ordinary skill in the art will appreciate that the fishing jig 100 is operable to be constructed of any material known in the art with appropriate strength. In one embodiment, the fishing jig 100 is painted or coated to mimic an animal and/or catch the attention of a fish. This painting or coating is operable to be waterproof and/or sealed with a clear coat of epoxy for a longer lifespan. In one embodiment, the fishing jig 100 has a higher density than water, and salt water or fresh water specifically, so that it will sink. In another embodiment, the fishing jig 100 has a lower density than water, and salt water or fresh water specifically, so that it will float.

In one embodiment, the hook tail 102 includes a fishing hook 110 protruding from and permanently attached to the hook tail 102. One of ordinary skill in the art will understand that the size of the fishing hook 110 is operable to be any size (one centimeter—one foot) to account for a large variety of fish sizes and application. In one embodiment, the fishing hook 110 is operable to be a single or treble hook. In one embodiment, the fishing hook 110 includes at least one barb to prevent the hook from falling out of the fish once it is hooked. In one embodiment, the fishing hook 110 is formed from a marine grade metal, including but not limited to, carbon steel (e.g., AH36, DH36, EH36, etc.), alloy steel (e.g., of grades MD, ME, MF, MG, etc.), stainless steel (e.g., grades 316, 304, etc.), galvanized steel, aluminum (e.g., grades 5052, 5083, etc.), copper (e.g., C70600, C71500, etc.), brass (e.g., C46200, C46400, C48500, etc.), and bronze (e.g., C65500, C95400, C51000, etc.). The use of marine grade metals provides longevity and strength needed for the fishing hook 110.

In one embodiment, the fishing hook 110 is removable and replaceable from the hook tail 102. In one embodiment, the fishing hook 110 is removable through a twist-on/twist-off system with a locking mechanism, such that it cannot screw off while in use in the water. The interchangeable fishing hook 110 allows the user to adjust the fishing jig 100 to use almost any hook size and style of their choosing making it more adaptable to almost any situation, such as for different fish. In one embodiment, the hook tail 102 incorporates a quick-release mechanism for the fishing hook 110 that facilitates effortless removal and replacement of the secure locking mechanism, ensuring the bait and hook remains firmly attached during retrieval, providing a seamless and efficient angling experience.

In one embodiment, the fishing jig 100 includes an eye 108 that is a small loop positioned at the top of and permanently attached to the main body of the hook tail 102. The eye is a loop that a fisherman passes the fishing line through and ties a knot around to connect fishing line to the fishing jig 100. In one embodiment the eye 108 is substantially perpendicular to the length of the fishing jig 100 to provide easy knot tying. The eye 108 is comprised of materials such as plastic, metal, and/or fiber reinforced composite. Preferably, the materials used provide a high strength-to-weight ratio for the fishing jig 100 for durability. In one embodiment, the material used for the fishing jig 100 includes a marine grade metal, including but not limited to, lead, carbon steel (e.g., AH36, DH36, EH36, etc.), alloy steel (e.g., of grades MD, ME, MF, MG, etc.), stainless steel (e.g., grades 316, 304, etc.), galvanized steel, aluminum (e.g., grades 5052, 5083, etc.), copper (e.g., C70600, C71500, etc.), brass (e.g., C46200, C46400, C48500, etc.), and bronze (e.g., C65500, C95400, C51000, etc.). The use of marine grade metals provides longevity for operation in wet and potentially salty environments.

Figure 2:
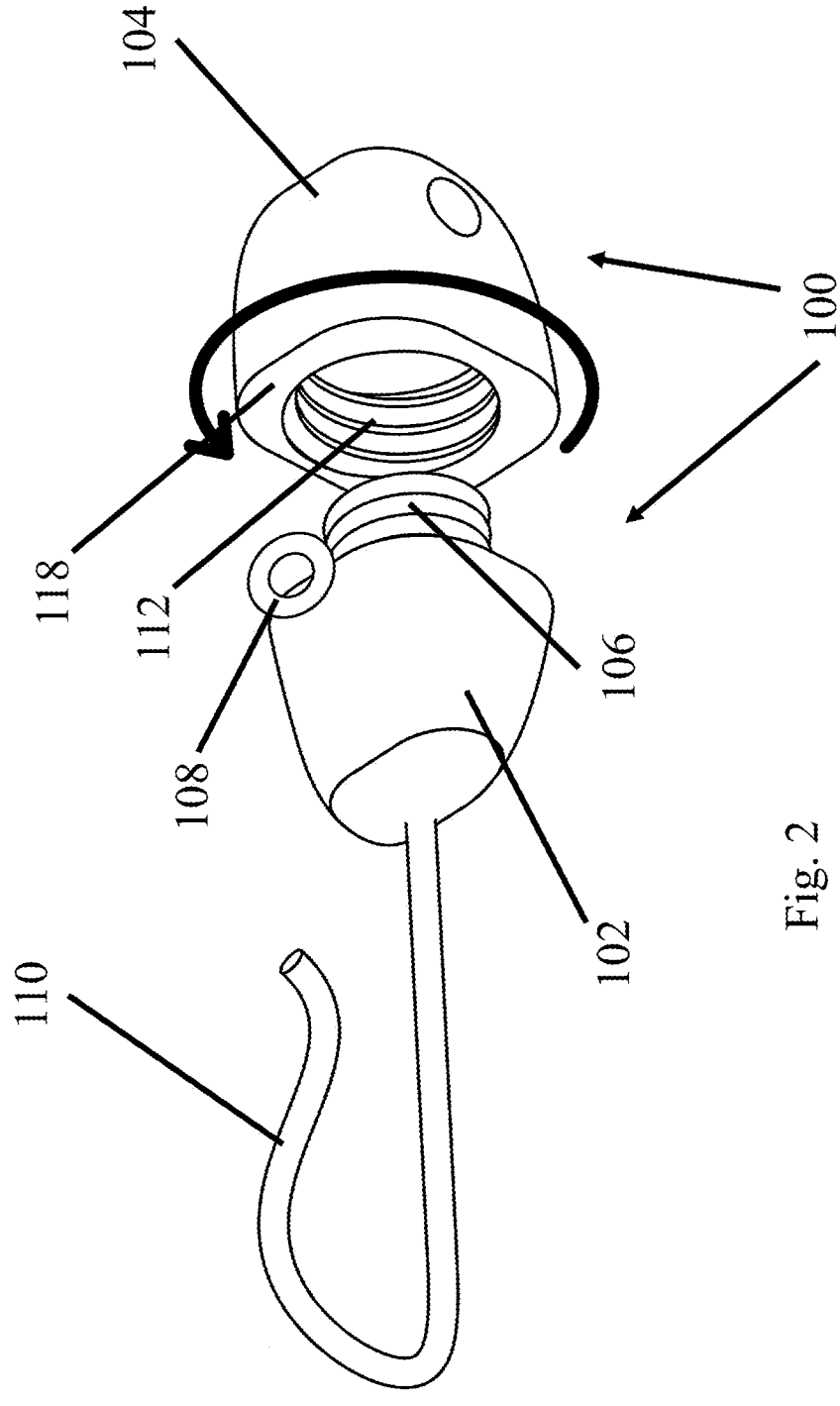
FIG. 2 illustrates a perspective exploded view of the fishing jig with movement indicators according to one embodiment of the present invention.

FIG. 2 illustrates a perspective exploded view of the fishing jig 100 with movement indicators. In one embodiment, the jig head 104 is operable to have a threaded post receptacle 112 with internal threads that complement the threads on the threaded attachment post 106. The threads are set to bottom out so that the jig head 104 is facing up and in line with respect to the body shape of the hook tail 102 and eye 108. The threaded attachment post 106 and threaded post receptacle 112 are comprised of materials such as one or more plastics, one or more metals, and/or one or more fiber reinforced composites. Preferably, the materials used provide a high strength-to-weight ratio for the fishing jig 100 for high durability. In one embodiment, the material used for the fishing jig 100 includes a marine grade metal, including but not limited to, lead, carbon steel (e.g., AH36, DH36, EH36, etc.), alloy steel (e.g., of grades MD, ME, MF, MG, etc.), stainless steel (e.g., grades 316, 304, etc.), galvanized steel, aluminum (e.g., grades 5052, 5083, etc.), copper (e.g., C70600, C71500, etc.), brass (e.g., C46200, C46400, C48500, etc.), and bronze (e.g., C65500, C95400, C51000, etc.). The use of marine grade metals provides longevity for the fishing jig 100, particularly in regular use in wet outdoor conditions. In one embodiment, the plastic or fiber reinforced composite fishing jig 100 is formed from materials or a coating is applied to achieve IP67 waterproof standards. In one embodiment, the plastic or fiber reinforced composite fishing jig 100 is formed from materials which meet ASTM G154 UV resistance standards, or a coating is applied to achieve ASTM G154 UV resistance standards. However, one of ordinary skill in the art will appreciate that the fishing jig 100 is able to be constructed of any material known in the art with appropriate strength. These durable materials will allow jig head 104 to be swapped out repetitively and still maintain a solid connection with the tail hook 102.

In one embodiment, the hook tail 102 is crafted with a substantially conical shape, featuring a rounded tip where the fishing hook 110 emerges. This conical form not only enhances the aesthetic appeal but also serves a functional purpose by minimizing water resistance, allowing for smoother maneuverability through aquatic environments. The base side of the conical hook tail 102 accommodates the threaded attachment post 106, providing a stable and streamlined foundation for the interchangeable components. Complementing the hook tail 102, the jig head 104 assumes the form of a half-cut ellipsoid, with the flat side 118 for mounting. On this flat side 118, a threaded post receptacle 112 is either cut into or placed, forming a mating integration point with the hook tail 102. When the jig head 104 and hook tail 102 are threaded together, the resulting assembly mimics the silhouette of a smaller bait fish or bug. This ability to adjust to the ideal bait for the situation provides a versatile tool for anglers seeking to optimize their catch. In one embodiment, the threaded post receptacle 112 is a metal threaded insert that is integrated into jig head 104 via heat and/or pressure.

Figure 3:
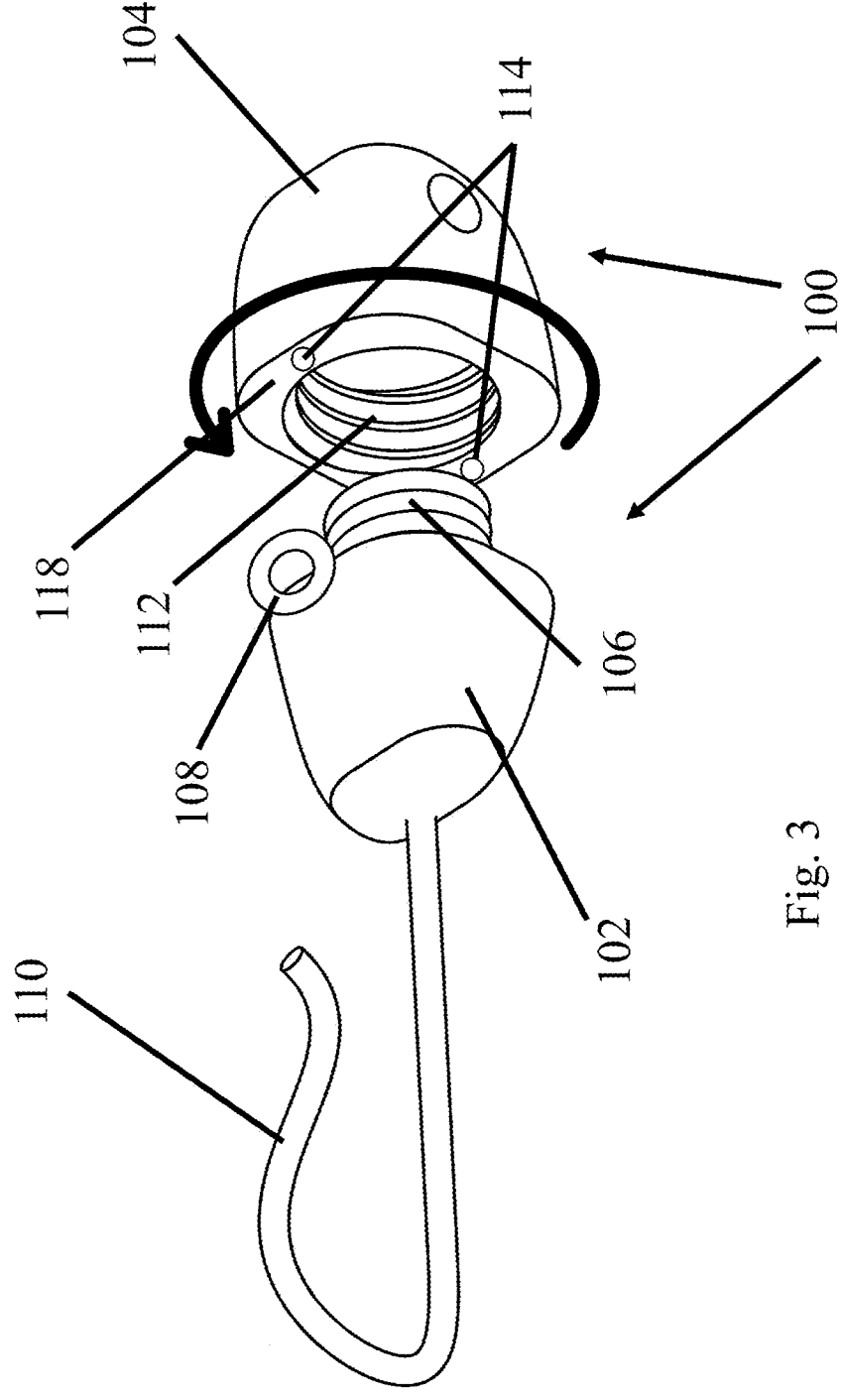
FIG. 3 illustrates a perspective exploded view of the fishing jig with movement indicators and a locking system according to one embodiment of the present invention.

FIG. 3 illustrates a perspective exploded view of the fishing jig 100 with movement indicators and a locking system. In one embodiment, the jig head 104 includes one or more locking bumps 114 that protrude from the flat side 118 of the jig head 104 around the threaded post receptacle 112 and correspond to one or more indentions on the tail hook 102 around the base of the threaded attachment post 106. These locking bumps make sure that the jig head twists into the correct alignment and ensures that the jig head does not rotate off the tail hook 102 when it is not intended by the user. In another embodiment, the jig head 104 introduces a magnetic locking mechanism for heightened stability. Specifically, one or more magnets are strategically positioned along the edge of the jig head 104 flat surface 118 around the thread post receptacle 112, complementing corresponding magnets on the tail hook 102. This magnetic alignment secures the jig head 104 in place, requiring a substantial force to disengage. This configuration not only prevents rotational movement but also ensures a reliable and durable connection, minimizing the risk of unintentional detachment during fishing activities. In another embodiment, there is a seal or rubber gasket located at the base of the of the threaded attachment post 106 so that when the jig head 104 is rotated onto the tail hook 102 the gasket is compressed. The gasket halts the rotation of the jig head 104 due to the friction and force of the compressed gasket pushing against the jig head 104 and the threads. The gasket also created a waterproof seal which is beneficial in maintaining a suitable buoyancy as well as helpful for maintaining the threads in good shape by preventing rusting or corrosion of the material from the presence of water.

Figure 4:
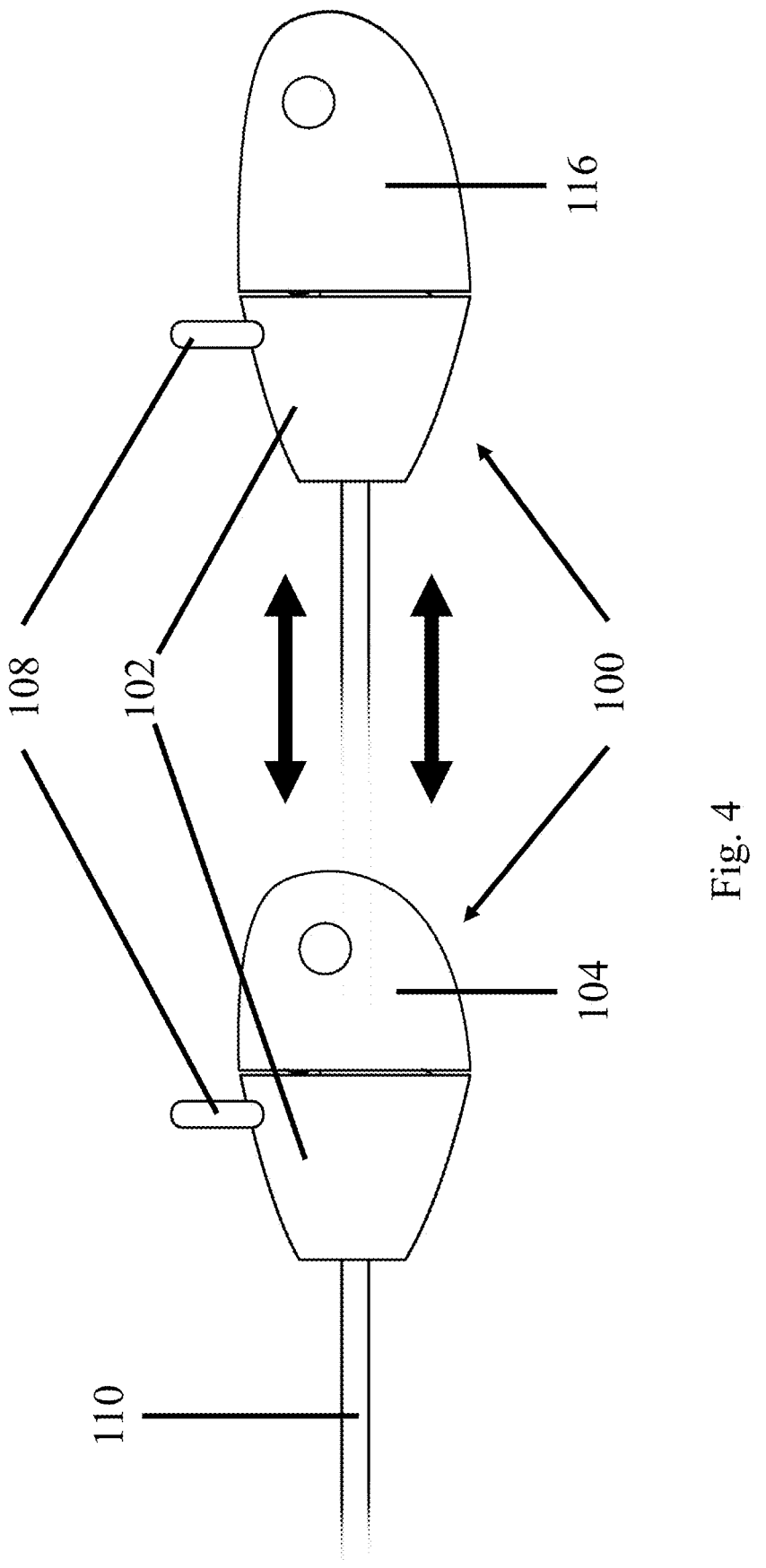
FIG. 4 illustrates two different variations of the fishing jig with two different jig heads according to one embodiment of the present invention.

FIG. 4 illustrates two different variations of the fishing jig 100 with two different jig heads. In one embodiment, the fishing jig 100 is operable to switch from a jig head 104 to a modified jig head 116. The modified jig head 116 is able to be placed onto the same tail hook 102 as the jig head 104 was on. The modularity of the fishing jig 100 allows the user to switch from a smaller jig head 104 to a larger modified jig head 116 without having to retie the fishing line. The variation of different jig heads could vary in size, shape, color, weight, material, texture and/or density. All of these variations are able to be switched in and out with the screw-on/screw-off mechanism. In a preferred embodiment, the jig head 104 features a visually engaging detail, such as one or more eyes intricately painted or attached onto its face. This aesthetic feature serves a dual purpose, enhancing the overall appeal of the fishing jig 100 and emulating the anatomical characteristics of prey, thereby enticing predatory fish. Further refinements in jig head design encompass specialized textures or reflective surfaces to augment the visual mimicry, presenting an innovative approach to enhancing the jig's effectiveness in attracting and engaging target fish species. This adaptability enables anglers to strategically configure the fishing jig 100 based on the target species, environmental conditions, and desired presentation in the water.

Figure 5:
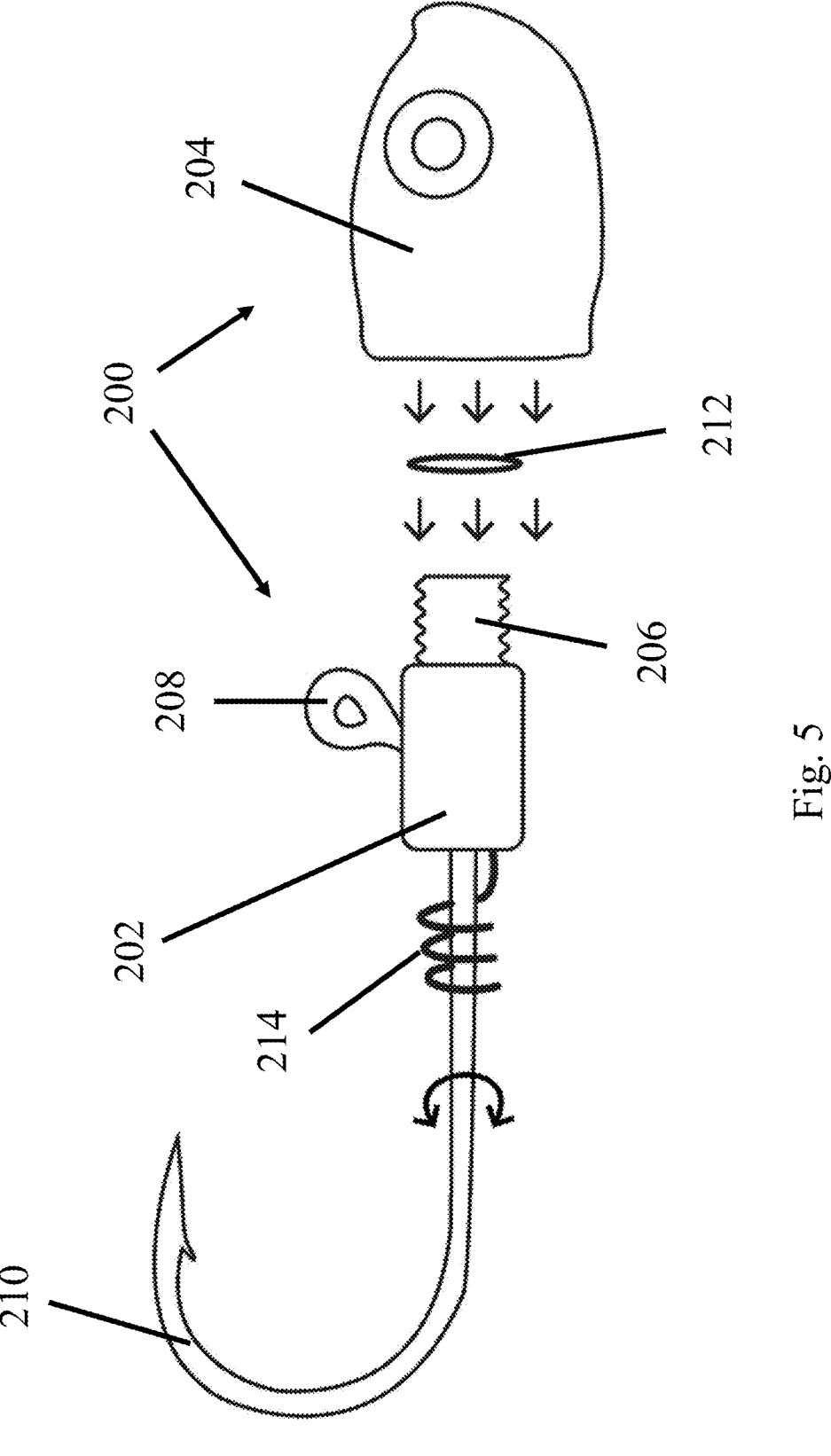
FIG. 5 illustrates a side exploded view of the fishing jig according to another embodiment of the present invention.

FIG. 5 illustrates a side exploded view of the fishing jig 200. In one embodiment, the fishing jig 200 is comprised of two main components, the hook tail 202 and the jig head 204, connected by a threaded attachment post 206 protruding from a front end of the hook tail 202. Additionally, there is a ring 212 in between the hook tail 202 and the jig head 204. The jig head 204 is operable to screw onto the threaded attachment post 206 via a threaded hole defined in the rear surface of the jig head 204. In another embodiment, the jig head 204 is connected by a threaded attachment post protruding from the rear end of jig head 204, which is operable to screw into a threaded hole defined in the front surface of the tail hook 202. In another embodiment, the hook tail 202 connects to the jig head 204 via a latch system for quick and easy removal and replacement while still being secure. In another embodiment, the hook tail 202 connects to the jig head 204 with a press fit connection that protrudes from the front of the hook tail 202 along with a complimentary press fit receptacle recessed into the rear of the jig head 204. This press-fit design enhances the structural integrity of the connection, providing a stable and reliable linkage between the hook tail 202 and the jig head 204. In another embodiment, the jig head 204 connects to the hook tail 202 via a snap-fit system.

In one embodiment, the fishing jig 200 is comprised of one or more materials, including but not limited to one or more plastics, one or more metals (e.g., stainless steel, aluminum, lead, etc.), fiber reinforced composite (e.g., carbon fiber, fiberglass, etc.), and/or elastomer (e.g., natural rubber, silicone, etc.). Preferably, the materials used provide a high strength-to-weight ratio for the fishing jig 200 for durability. In one embodiment, the material used for the fishing jig 200 includes a marine grade metal, including but not limited to, lead, carbon steel (e.g., AH36, DH36, EH36, etc.), alloy steel (e.g., of grades MD, ME, MF, MG, etc.), stainless steel (e.g., grades 316, 304, etc.), galvanized steel, aluminum (e.g., grades 5052, 5083, etc.), copper (e.g., C70600, C71500, etc.), brass (e.g., C46200, C46400, C48500, etc.), and bronze (e.g., C65500, C95400, C51000, etc.). The use of marine grade metals provides longevity for the fishing jig 200, particularly in regular use in wet outdoor conditions. In one embodiment, the plastic or fiber reinforced composite fishing jig 200 is formed from materials or a coating is applied to achieve IP67 waterproof standards. In one embodiment, the plastic or fiber reinforced composite fishing jig 200 is formed from materials which meet ASTM G154 UV resistance standards, or a coating is applied to achieve ASTM G154 UV resistance standards. However, one of ordinary skill in the art will appreciate that the fishing jig 200 is operable to be constructed of any material known in the art with appropriate strength. In one embodiment, the fishing jig 200 is painted or coated to mimic an animal and/or catch the attention of a fish. This painting or coating is operable to be waterproof and/or sealed with a clear coat of epoxy for a longer lifespan. In one embodiment, the fishing jig 200 has a higher density than water, and salt water or fresh water specifically, so that it will sink. In another embodiment, the fishing jig 200 has a lower density than water, and salt water or fresh water specifically, so that it will float.

In one embodiment, the hook tail 202 includes a fishing hook 210 protruding from and permanently attached to the hook tail 202. One of ordinary skill in the art will understand that the size of the fishing hook 210 is operable to be any size (one centimeter-one foot) to account for a large variety of fish sizes and application. In one embodiment, the fishing hook 210 is operable to be a single or treble hook. In one embodiment, the fishing hook 210 includes at least one barb to prevent the hook from falling out of the fish once it is hooked. In one embodiment, the fishing hook 210 is formed from a marine grade metal, including but not limited to, carbon steel (e.g., AH36, DH36, EH36, etc.), alloy steel (e.g., of grades MD, ME, MF, MG, etc.), stainless steel (e.g., grades 316, 304, etc.), galvanized steel, aluminum (e.g., grades 5052, 5083, etc.), copper (e.g., C70600, C71500, etc.), brass (e.g., C46200, C46400, C48500, etc.), and bronze (e.g., C65500, C95400, C51000, etc.). The use of marine grade metals provides longevity and strength needed for the fishing hook 210.

In one embodiment, the fishing hook 210 is removable and replaceable from the hook tail 202. In one embodiment, the fishing hook 210 is removable through a twist-on/twist-off system with a locking mechanism, such that it cannot screw off while in use in the water. The interchangeable fishing hook 210 allows the user to adjust the fishing jig 200 to use almost any hook size and style of their choosing making it more adaptable to almost any situation, such as for different fish. In one embodiment, the hook tail 202 incorporates a quick-release mechanism for the fishing hook 210 that facilitates effortless removal and replacement of the secure locking mechanism, ensuring the bait and hook remains firmly attached during retrieval, providing a seamless and efficient angling experience. In one embodiment, the hook tail 202 includes a corkscrew 214 attached to the base of the hook tail 202 and wrapped around the fishing hook 210. In one embodiment, the corkscrew 214 secures a soft lure. In one embodiment, the corkscrew 214 forms a unitary body with the hook tail 202. In one embodiment, the material used for the corkscrew 214 includes a marine grade metal, including but not limited to, lead, carbon steel (e.g., AH36, DH36, EH36, etc.), alloy steel (e.g., of grades MD, ME, MF, MG, etc.), stainless steel (e.g., grades 316, 304, etc.), galvanized steel, aluminum (e.g., grades 5052, 5083, etc.), copper (e.g., C70600, C71500, etc.), brass (e.g., C46200, C46400, C48500, etc.), and bronze (e.g., C65500, C95400, C51000, etc.). In one embodiment, attachments, including but not limited to skirts, tassels, feathers, and plastic pieces, can be tied to the corkscrew 214 to attract fish via motion, colors, vibrations, reflections, and/or other techniques to mimic bait. In one embodiment, attachments are connected to the hook tail 202 by a thread, string, wire, and/or cord and secured in place with resin, wherein the attachment surface is the back half of the hook tail 202. In one embodiment, attachments are secured in place with a complementary, form-fitting plastic that fits around the hook tail 202. One of ordinary skill in the art will appreciate that the thread, string, wire, and/or cord is to be constructed of any material known in the art with appropriate tensile strength. The resin includes but not limited to epoxy, polyester, polyurethane, and vinyl ester. In one embodiment, the attachments are integrally formed with the hook tail 202. In one embodiment, the jig head 204 is operable to connect to a soft lure, wherein the soft lure is proportional to the jig head 204. In one embodiment, the soft lure is shaped to mimic the silhouette of a fish body. In one embodiment, the soft lure is shaped to mimic the silhouette of a fish tail. In one embodiment, the soft lure is shaped to mimic the silhouette of prey (e.g., smaller bait fish, worms, lizards, insects, crustaceans, etc.). In one embodiment, the overall shape of the assembled fishing jig 200 including the soft lure mimics the silhouette of prey. In one embodiment, the soft lure is operable to attach to the hook tail 202. In one embodiment, the material used for the soft lure is made from a substantially flexible material, such as silicone or plastisol as is known to those of skill in the art. In one embodiment, the material used for the soft lure is made from a biodegradable polymer. In one embodiment, the soft lure is comprised of additives (e.g., salt, glitter, dye, scent, oil, etc.) to attract fish. In one embodiment, the soft lure flexes as it travels in the water, mimicking prey behavior to attract fish. In one embodiment, the soft lure is integrally formed with the hook tail 202.

In one embodiment, the fishing jig 200 includes an eye 208 that is a small loop positioned at the top of and permanently attached to the main body of the hook tail 202. The eye is a loop that a fisherman passes the fishing line through and ties a knot around to connect fishing line to the fishing jig 200. In one embodiment, the eye 208 is substantially perpendicular to the length of the fishing jig 200 to provide easy knot tying. The eye 208 is comprised of materials such as plastic, metal, and/or fiber reinforced composite. Preferably, the materials used provide a high strength-to-weight ratio for the fishing jig 200 for durability. In one embodiment, the material used for the fishing jig 200 includes a marine grade metal, including but not limited to, lead, carbon steel (e.g., AH36, DH36, EH36, etc.), alloy steel (e.g., of grades MD, ME, MF, MG, etc.), stainless steel (e.g., grades 316, 304, etc.), galvanized steel, aluminum (e.g., grades 5052, 5083, etc.), copper (e.g., C70600, C71500, etc.), brass (e.g., C46200, C46400, C48500, etc.), and bronze (e.g., C65500, C95400, C51000, etc.). The use of marine grade metals provides longevity for operation in wet and potentially salty environments.

Figure 6:
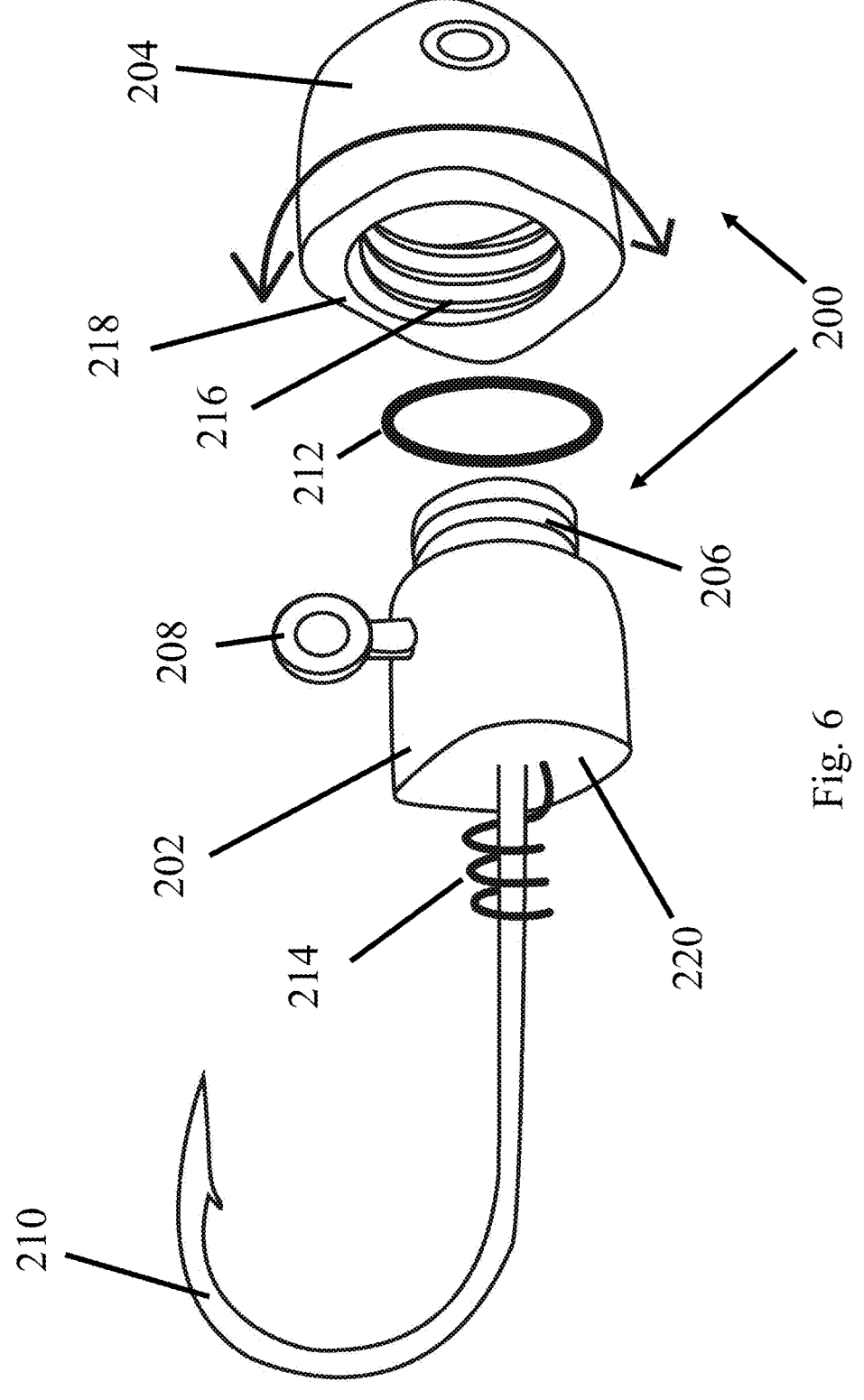
FIG. 6 illustrates a perspective exploded view of the fishing jig with movement indicators according to another embodiment of the present invention.

FIG. 6 illustrates a perspective exploded view of the fishing jig 200 with movement indicators. In one embodiment, the jig head 204 is operable to have a threaded post receptacle 216 with internal threads that complement the threads on the threaded attachment post 206. The threads are set to bottom out so that the jig head 204 is facing up and in line with respect to the body shape of the hook tail 202 and eye 208. The threaded attachment post 206 and threaded post receptacle 216 are comprised of materials such as one or more plastics, one or more metals, and/or one or more fiber reinforced composites. Preferably, the materials used provide a high strength-to-weight ratio for the fishing jig 200 for high durability. In one embodiment, the threaded post receptacle 216 and threaded attachment post 206 have at least four threads, securing the connection between the jig head 204 and the hook tail 202. In one embodiment, the jig head 204 is secured to the hook tail 202 after twisting the jig head 204 for three full turns. In one embodiment, the jig head 204 is secured to the hook tail 202 after twisting the jig head 204 for multiple turns, until the threads bottom out. In one embodiment, the ring 212 is located between the jig head 204 and hook tail 202, and the ring 212 is used to provide suction between the jig head 204 and the hook tail 202 to hold these components together. The ring 212 creates a waterproof seal which is beneficial in maintaining a suitable buoyancy as well as helpful for maintaining the threads in good shape by preventing rusting or corrosion of the material from the presence of water. The ring 212 is preferably made of rubber. In one embodiment, the ring 212 is located at the base of the threaded attachment post 206 so that when the jig head 204 is rotated onto the tail hook 202, the ring 212 is compressed. The ring 212 halts the rotation of the jig head 204 due to the friction and force of the compressed ring 212 pushing against the jig head 204 and the threads. The ring 212 also created a waterproof seal which is beneficial in maintaining a suitable buoyancy as well as helpful for maintaining the threads in good shape by preventing rusting or corrosion of the material from the presence of water. In one embodiment, the material used for the fishing jig 200 includes a marine grade metal, including but not limited to, lead, carbon steel (e.g., AH36, DH36, EH36, etc.), alloy steel (e.g., of grades MD, ME, MF, MG, etc.), stainless steel (e.g., grades 316, 304, etc.), galvanized steel, aluminum (e.g., grades 5052, 5083, etc.), copper (e.g., C70600, C71500, etc.), brass (e.g., C46200, C46400, C48500, etc.), and bronze (e.g., C65500, C95400, C51000, etc.). The use of marine grade metals provides longevity for the fishing jig 200, particularly in regular use in wet outdoor conditions. In one embodiment, the plastic or fiber reinforced composite fishing jig 200 is formed from materials or a coating is applied to achieve IP67 waterproof standards. In one embodiment, the plastic or fiber reinforced composite fishing jig 200 is formed from materials which meet ASTM G154 UV resistance standards, or a coating is applied to achieve ASTM G154 UV resistance standards. However, one of ordinary skill in the art will appreciate that the fishing jig 200 is able to be constructed of any material known in the art with appropriate strength. These durable materials will allow jig head 204 to be swapped out repetitively and still maintain a solid connection with the tail hook 202. In one embodiment, the weight of the jig head 204 can range from 0.015625 oz increments up to 20 oz. In one embodiment, the jig head 204 can weigh from 0.015625 oz to 15 oz. In one embodiment, the jig head 204 can weigh from 0.0625 oz to 3 oz. In one embodiment, the jig head 204 can weigh from 0.5 to 1.5 oz. In one embodiment, the weight of the jig head 204 is an increment of 0.015625 oz. In one embodiment, the weight of the jig head 204 is an increment of 0.0625 oz. In one embodiment, the weight of the jig head 204 is an increment of 0.125 oz. In one embodiment, the weight of the jig head 204 is an increment of 0.25 oz. In one embodiment, the weight of the jig head 204 is an increment of 0.5 oz.

In one embodiment, the hook tail 202 is crafted with a substantially conical shape, featuring a rounded tip where the fishing hook 210 emerges. This conical form not only enhances the aesthetic appeal but also serves a functional purpose by minimizing water resistance, allowing for smoother maneuverability through aquatic environments. The base side of the conical hook tail 202 accommodates the threaded attachment post 206, providing a stable and streamlined foundation for the interchangeable components. Complementing the hook tail 202, the jig head 204 assumes the form of a half-cut ellipsoid, with the flat side 218 for mounting. On this flat side 218, a threaded post receptacle 216 is either cut into or placed, forming a mating integration point with the hook tail 202. When the jig head 204 and hook tail 202 are threaded together, the resulting assembly mimics the silhouette of a smaller bait fish or bug. This ability to adjust to the ideal bait for the situation provides a versatile tool for anglers seeking to optimize their catch. In one embodiment, the threaded post receptacle 216 is a metal threaded insert that is integrated into jig head 204 via heat and/or pressure. In another embodiment, the hook tail 202 ends with a flat surface 220 to which the fishing hook 210 is attached. In another embodiment, a corkscrew 214 emerges from the flat surface 220 of the hook tail 202, and the corkscrew 214 wraps around the base of the fishing hook 210. Designed with a flat surface 220, the hook tail 202 is easier to manufacture, visually indicates an easy stop for the user during assembly, provides for a stop to prevent over-turning of the components, and is less likely to dent if the user drops the lure, which would compromise the ease of future assembly.

Figure 7:
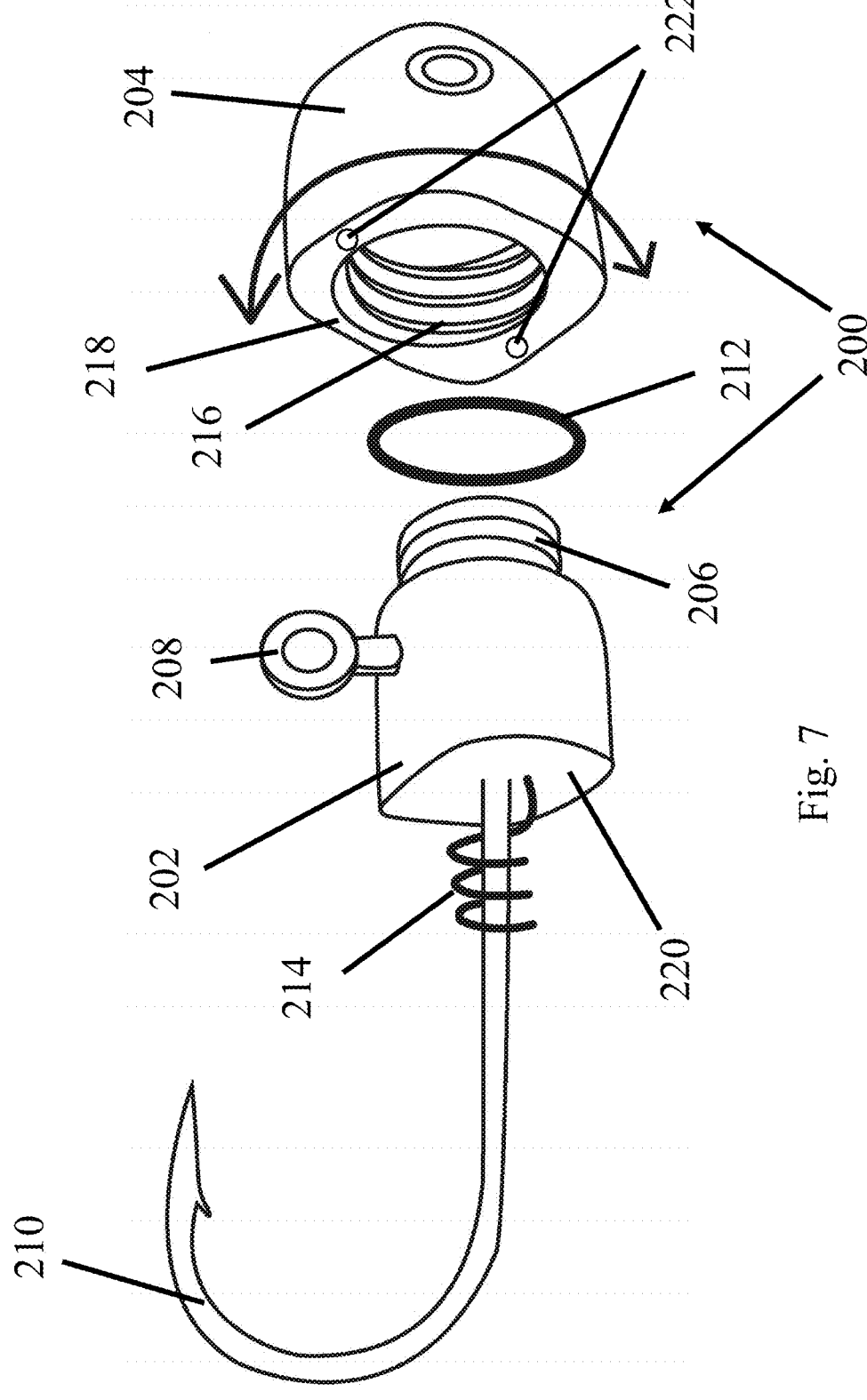
FIG. 7 illustrates a perspective exploded view of the fishing jig with movement indicators and a locking system according to another embodiment of the present invention.

FIG. 7 illustrates a perspective exploded view of the fishing jig 200 with movement indicators and a locking system. In one embodiment, the jig head 204 includes one or more locking bumps 222 that protrude from the flat side 218 of the jig head 204 around the threaded post receptacle 216 and correspond to one or more indentions on the tail hook 202 around the base of the threaded attachment post 206. These locking bumps make sure that the jig head twists into the correct alignment and ensures that the jig head does not rotate off the tail hook 202 when it is not intended by the user. In another embodiment, the jig head 204 introduces a magnetic locking mechanism for heightened stability. Spe-cifically, one or more magnets are strategically positioned along the edge of the jig head 204 flat surface 218 around the thread post receptacle 216, complementing corresponding magnets on the tail hook 202. This magnetic alignment secures the jig head 204 in place, requiring a substantial force to disengage. This configuration not only prevents rotational movement but also ensures a reliable and durable connection, minimizing the risk of unintentional detachment during fishing activities.

Figure 8:
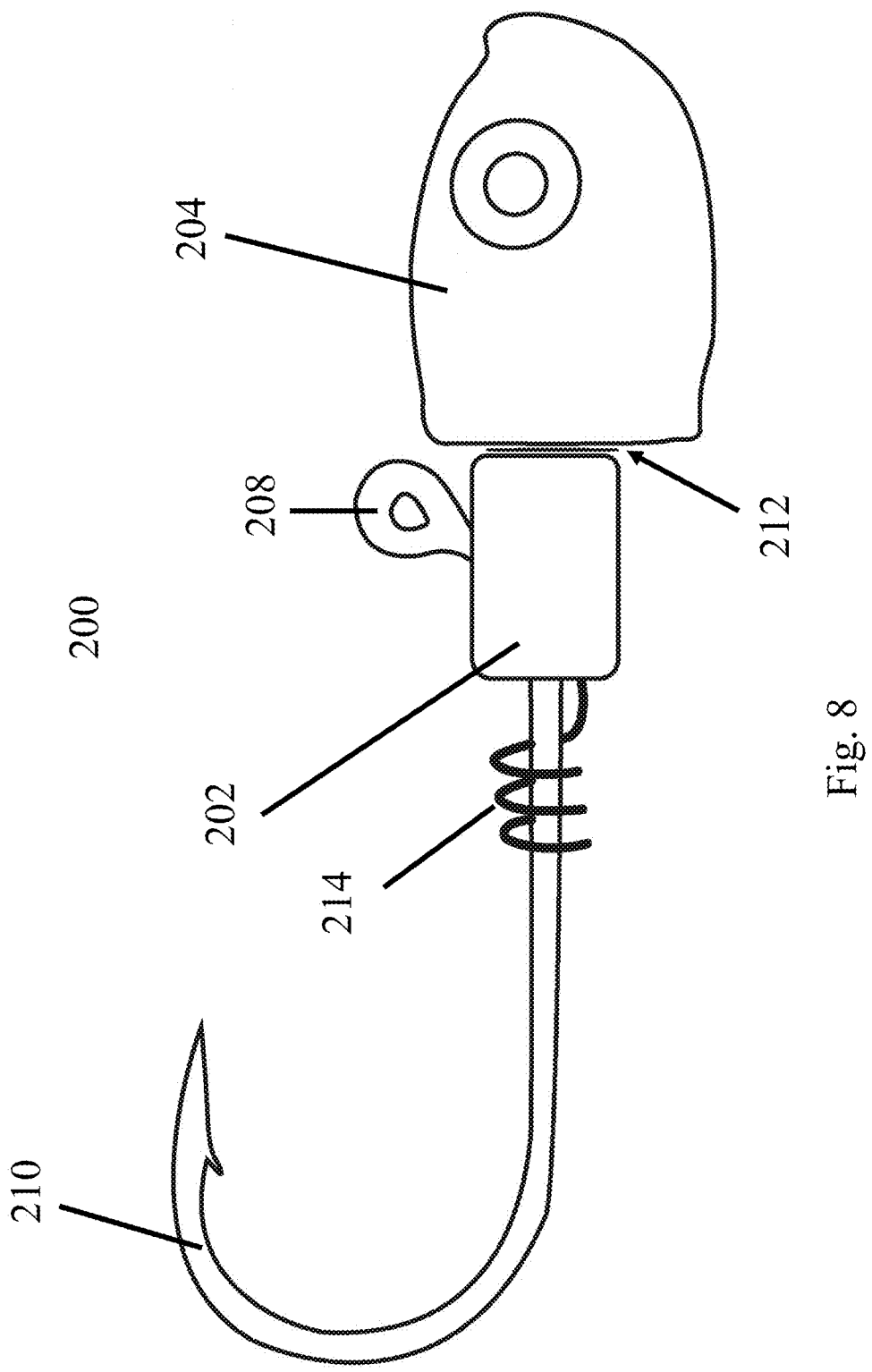
FIG. 8 illustrates a side view of the fishing jig fully assembled according to another embodiment of the present invention.

FIG. 8 illustrates the side view of the assembled fishing jig 200. The modularity of the fishing jig 200 allows the user to switch between various jig heads based on the conditions and type of fish the user is targeting without having to retie the fishing line. The variation of different jig heads could vary in size, shape, color, weight, material, texture, and/or density. All of these variations are able to be switched in and out with the screw-on/screw-off mechanism. In a preferred embodiment, the jig head 204 features a visually engaging detail, such as one or more eyes intricately painted or attached onto its face. This aesthetic feature serves a dual purpose, enhancing the overall appeal of the fishing jig 200 and emulating the anatomical characteristics of prey, thereby enticing predatory fish. Further refinements in jig head design encompass specialized textures or reflective surfaces to augment the visual mimicry, presenting an innovative approach to enhancing the jig's effectiveness in attracting and engaging target fish species. This adaptability enables anglers to strategically configure the fishing jig 200 based on the target species, environmental conditions, and desired presentation in the water.

In one embodiment, the jig head 204 and hook tail 202 are attached via magnets instead of a screw-lock mechanism. Specifically, one or more magnets are in the jig head 204 and hook tail 202, wherein the one or more magnets are strate-gically positioned to be located where the jig head 204 and hook tail 202 interface. Magnets used in the present inven-tion are operable to include neodymium magnets as well as any other compact, high-strength magnets known in the art.

Figure 9:
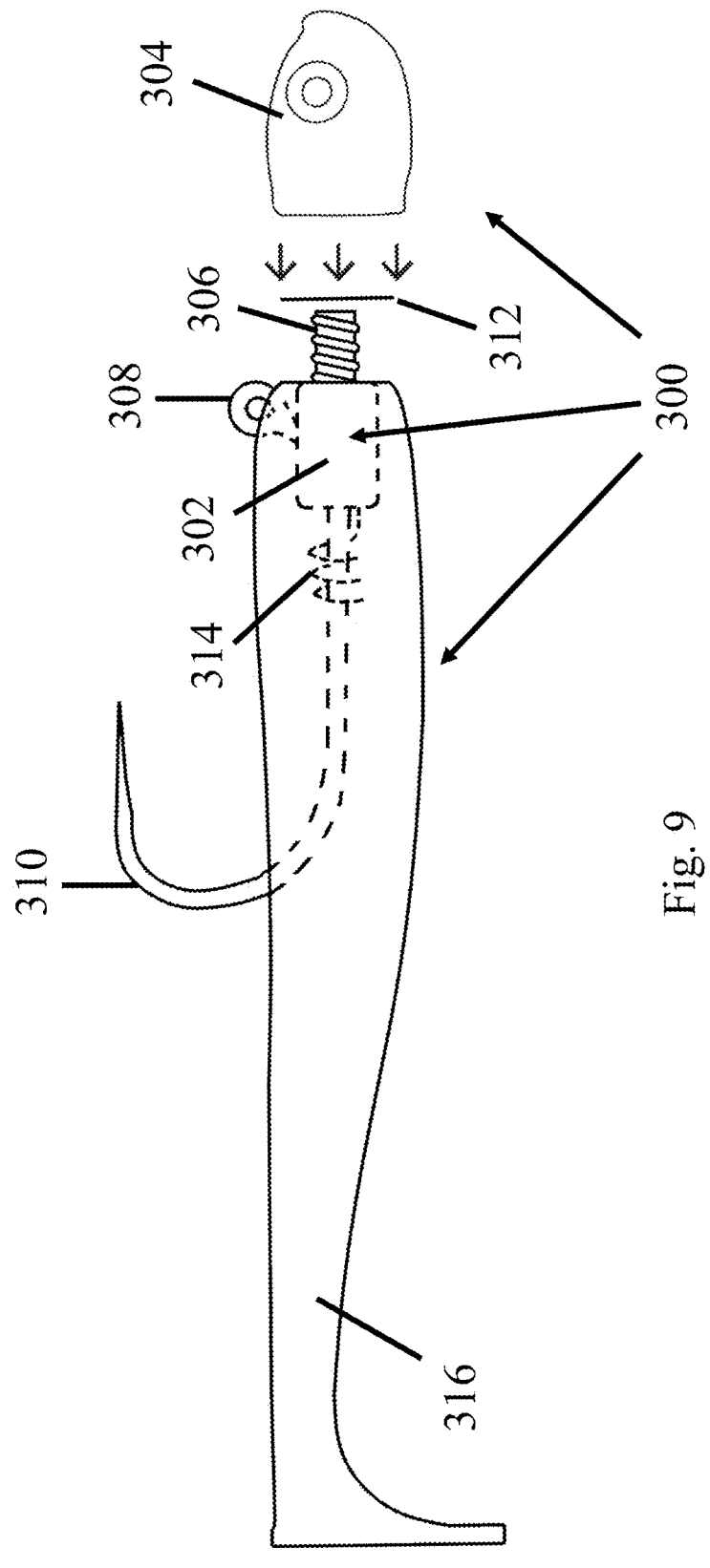
FIG. 9 illustrates a transparent orthogonal side view of the fishing jig with a soft lure according to another embodiment of the present invention.

FIG. 9 illustrates a transparent orthogonal side view of the fishing jig 300 with a soft lure 316. In one embodiment, the fishing jig 300 is comprised of three main components, the hook tail 302, the soft lure 316, and the jig head 304, connected by a threaded attachment post 306 protruding from a front end of the hook tail 302. Additionally, there is a ring 312 in between the hook tail 302 and the jig head 304. The jig head 304 is operable to screw onto the threaded attachment post 306 via a threaded hole defined in the rear surface of the jig head 304. In another embodiment, the jig head 304 is connected by a threaded attachment post pro-truding from the rear end of jig head 304, which is operable to screw into a threaded hole defined in the front surface of the tail hook 302. In another embodiment, the hook tail 302 connects to the jig head 304 via a latch system for quick and easy removal and replacement while still being secure. In another embodiment, the hook tail 302 connects to the jig head 304 with a press fit connection that protrudes from the front of the hook tail 302 along with a complimentary press fit receptacle recessed into the rear of the jig head 304. This press-fit design enhances the structural integrity of the connection, providing a stable and reliable linkage between the hook tail 302 and the jig head 304. In another embodi-ment, the jig head 304 connects to the hook tail 302 via a snap-fit system.

In one embodiment, the fishing jig 300 is comprised of one or more materials, including but not limited to one or more plastics, one or more metals (e.g., stainless steel, aluminum, lead, etc.), fiber reinforced composite (e.g., car-bon fiber, fiberglass, etc.), and/or elastomer (e.g., natural rubber, silicone, etc.). Preferably, the materials used provide a high strength-to-weight ratio for the fishing jig 300 for durability. In one embodiment, the material used for the fishing jig 300 includes a marine grade metal, including but not limited to, lead, carbon steel (e.g., AH36, DH36, EH36, etc.), alloy steel (e.g., of grades MD, ME, MF, MG, etc.), stainless steel (e.g., grades 316, 304, etc.), galvanized steel, aluminum (e.g., grades 5052, 5083, etc.), copper (e.g., C70600, C71500, etc.), brass (e.g., C46200, C46400, C48500, etc.), and bronze (e.g., C65500, C95400, C51000, etc.). The use of marine grade metals provides longevity for the fishing jig 300, particularly in regular use in wet outdoor conditions. In one embodiment, the plastic or fiber rein-forced composite fishing jig 300 is formed from materials or a coating is applied to achieve IP67 waterproof standards. In one embodiment, the plastic or fiber reinforced composite fishing jig 300 is formed from materials which meet ASTM G154 UV resistance standards, or a coating is applied to achieve ASTM G154 UV resistance standards. However, one of ordinary skill in the art will appreciate that the fishing jig 300 is operable to be constructed of any material known in the art with appropriate strength. In one embodiment, the fishing jig 300 is painted or coated to mimic an animal and/or catch the attention of a fish. This painting or coating is operable to be waterproof and/or sealed with a clear coat of epoxy for a longer lifespan. In one embodiment, the fishing jig 300 has a higher density than water, and salt water or fresh water specifically, so that it will sink. In another embodiment, the fishing jig 300 has a lower density than water, and salt water or fresh water specifically, so that it will float.

In one embodiment, the hook tail 302 includes a fishing hook 310 protruding from and permanently attached to the hook tail 302. One of ordinary skill in the art will understand that the size of the fishing hook 310 is operable to be any size (one centimeter-one foot) to account for a large variety of fish sizes and application. In one embodiment, the fishing hook 310 is operable to be a single or treble hook. In one embodiment, the fishing hook 310 includes at least one barb to prevent the hook from falling out of the fish once it is hooked. In one embodiment, the fishing hook 310 is formed from a marine grade metal, including but not limited to, carbon steel (e.g., AH36, DH36, EH36, etc.), alloy steel (e.g., of grades MD, ME, MF, MG, etc.), stainless steel (e.g., grades 316, 304, etc.), galvanized steel, aluminum (e.g., grades 5052, 5083, etc.), copper (e.g., C70600, C71500, etc.), brass (e.g., C46200, C46400, C48500, etc.), and bronze (e.g., C65500, C95400, C51000, etc.). The use of marine grade metals provides longevity and strength needed for the fishing hook 310.

In one embodiment, the fishing hook 310 is removable and replaceable from the hook tail 302. In one embodiment, the fishing hook 310 is removable through a twist-on/twist-off system with a locking mechanism, such that it cannot screw off while in use in the water. The interchangeable fishing hook 310 allows the user to adjust the fishing jig 300 to use almost any hook size and style of their choosing making it more adaptable to almost any situation, such as for different fish. In one embodiment, the hook tail 302 incorporates a quick-release mechanism for the fishing hook 310 that facilitates effortless removal and replacement of the secure locking mechanism, ensuring the bait and hook remains firmly attached during retrieval, providing a seamless and efficient angling experience. In one embodiment, the hook tail 302 includes a corkscrew 314 attached to the base of the hook tail 302 and wrapped around the fishing hook 310. In one embodiment, the corkscrew 314 secures a soft lure 316. In one embodiment, the corkscrew 314 forms a unitary body with the hook tail 302. In one embodiment, the material used for the corkscrew 314 includes a marine grade metal, including but not limited to, lead, carbon steel (e.g., AH36, DH36, EH36, etc.), alloy steel (e.g., of grades MD, ME, MF, MG, etc.), stainless steel (e.g., grades 316, 304, etc.), galvanized steel, aluminum (e.g., grades 5052, 5083, etc.), copper (e.g., C70600, C71500, etc.), brass (e.g., C46200, C46400, C48500, etc.), and bronze (e.g., C65500, C95400, C51000, etc.). In one embodiment, the corkscrew 314 is detachable to the hook tail 302.

In one embodiment, the fishing jig 300 includes an eye 308 that is a small loop positioned at the top of and permanently attached to the main body of the hook tail 302. The eye is a loop that a fisherman passes the fishing line through and ties a knot around to connect fishing line to the fishing jig 300. In one embodiment, the eye 308 is substantially perpendicular to the length of the fishing jig 300 to provide easy knot tying. The eye 308 is comprised of materials such as plastic, metal, and/or fiber reinforced composite. Preferably, the materials used provide a high strength-to-weight ratio for the fishing jig 300 for durability. In one embodiment, the material used for the fishing jig 300 includes a marine grade metal, including but not limited to, lead, carbon steel (e.g., AH36, DH36, EH36, etc.), alloy steel (e.g., of grades MD, ME, MF, MG, etc.), stainless steel (e.g., grades 316, 304, etc.), galvanized steel, aluminum (e.g., grades 5052, 5083, etc.), copper (e.g., C70600, C71500, etc.), brass (e.g., C46200, C46400, C48500, etc.), and bronze (e.g., C65500, C95400, C51000, etc.). The use of marine grade metals provides longevity for operation in wet and potentially salty environments.

In one embodiment, attachments, including but not limited to skirts, tassels, feathers, and plastic pieces, can be tied to the eye 308 to attract fish via motion, colors, vibrations, reflections, and/or other techniques to mimic bait. In one embodiment, attachments are connected to the hook tail 302 by a thread, string, wire, and/or cord and secured in place with resin, wherein the attachment surface is the back half of the hook tail 302. In one embodiment, attachments are secured in place with a complementary, form-fitting plastic that fits around the hook tail 302. One of ordinary skill in the art will appreciate that the thread, string, wire, and/or cord is to be constructed of any material known in the art with appropriate tensile strength. The resin includes but not limited to epoxy, polyester, polyurethane, and vinyl ester. In one embodiment, the attachments are integrally formed with the hook tail 302. In one embodiment, the jig head 304 is operable to connect to a soft lure 316, wherein the soft lure 316 is proportional to the jig head 304. In one embodiment, the soft lure 316 is shaped to mimic the silhouette of a fish body. In one embodiment, the soft lure 316 is shaped to mimic the silhouette of a fish tail. In one embodiment, the soft lure 316 is shaped to mimic the silhouette of prey (e.g., smaller bait fish, worms, lizards, insects, crustaceans, etc.). In one embodiment, the overall shape of the assembled fishing jig 300 including the soft lure 316 mimics the silhouette of prey. In one embodiment, the soft lure 316 is operable to attach to the hook tail 302. In one embodiment, the material used for the soft lure 316 is made from a substantially flexible material, such as silicone or plastisol as is known to those of skill in the art. In one embodiment, the material used for the soft lure 316 is made from a biodegradable polymer. In one embodiment, the soft lure 316 is comprised of additives (e.g., salt, glitter, dye, scent, oil, etc.) to attract fish. In one embodiment, the soft lure 316 flexes as it travels in the water, mimicking prey behavior to attract fish. In one embodiment, the soft lure 316 is integrally formed with the hook tail 302. In one embodiment, the hook tail 302, including the fishing hook 310, eye 308, and corkscrew 314, is operable to be combined with the soft lure 316, wherein the tip of the fishing hook 310 enters the head of the soft lure 316 and exits through the body of the soft lure 316. In another embodiment, the corkscrew 314 may not be present during the attachment of the soft lure 316 with the hook tail 302 and fishing hook 310. In yet another embodiment, the fishing hook 310 is operable to be combined with the soft lure 316, wherein the soft lure 316 is comprised of at least one attachment point for the fishing line. In one embodiment, the hook tail 302 is fully encased by the soft lure 316. In another embodiment, the hook tail 302 is partially encased by the soft lure 316, wherein the front surface of the hook tail 302 that connects to the threaded attachment post 306 is exposed.

In one embodiment, the jig head 304 is operable to have a threaded post receptacle with internal threads that complement the threads on the threaded attachment post 306. The threads are set to bottom out so that the jig head 304 is facing up and in line with respect to the body shape of the hook tail 302 and eye 308. The threaded attachment post 306 and threaded post receptacle are comprised of materials such as one or more plastics, one or more metals, and/or one or more fiber reinforced composites. Preferably, the materials used provide a high strength-to-weight ratio for the fishing jig 300 for high durability. In one embodiment, the threaded post receptacle and threaded attachment post 306 have at least four threads, securing the connection between the jig head 304 and the hook tail 302. In one embodiment, the jig head 304 is secured to the hook tail 302 after twisting the jig head 304 for three full turns. In one embodiment, the jig head 304 is secured to the hook tail 302 after twisting the jig head 304 for multiple turns, until the threads bottom out. In one embodiment, the ring 312 is located between the jig head 304 and hook tail 302, and the ring 312 is used to provide suction between the jig head 304 and the hook tail 302 to hold these components together. The ring 312 creates a waterproof seal which is beneficial in maintaining a suitable buoyancy as well as helpful for maintaining the threads in good shape by preventing rusting or corrosion of the material from the presence of water. The ring 312 is preferably made of rubber. In one embodiment, the ring 312 is located at the base of the threaded attachment post 306 so that when the jig head 304 is rotated onto the tail hook 302, the ring 312 is compressed. The ring 312 halts the rotation of the jig head 304 due to the friction and force of the compressed ring 312 pushing against the jig head 304 and the threads. The ring 312 also creates a waterproof seal which is beneficial in maintaining a suitable buoyancy as well as helpful for maintaining the threads in good shape by preventing rusting or corrosion of the material from the presence of water. In one embodiment, the material used for the fishing jig 300 includes a marine grade metal, including but not limited to, lead, carbon steel (e.g., AH36, DH36, EH36, etc.), alloy steel (e.g., of grades MD, ME, MF, MG, etc.), stainless steel (e.g., grades 316, 304, etc.), galvanized steel, aluminum (e.g., grades 5052, 5083, etc.), copper (e.g., C70600, C71500, etc.), brass (e.g., C46200, C46400, C48500, etc.), and bronze (e.g., C65500, C95400, C51000, etc.). The use of marine grade metals provides longevity for the fishing jig 300, particularly in regular use in wet outdoor conditions. In one embodiment, the plastic or fiber reinforced composite fishing jig 300 is formed from materials or a coating is applied to achieve IP67 waterproof standards. In one embodiment, the plastic or fiber reinforced composite fishing jig 300 is formed from materials which meet ASTM G154 UV resistance standards, or a coating is applied to achieve ASTM G154 UV resistance standards. However, one of ordinary skill in the art will appreciate that the fishing jig 300 is able to be constructed of any material known in the art with appropriate strength. These durable materials will allow jig head 304 to be swapped out repetitively and still maintain a solid connection with the tail hook 302. In one embodiment, the weight of the jig head 304 can range from 0.015625 oz increments up to 20 oz. In one embodiment, the jig head 304 can weigh from 0.015625 oz to 15 oz. In one embodiment, the jig head 304 can weigh from 0.0625 oz to 3 oz. In one embodiment, the jig head 304 can weigh from 0.5 to 1.5 oz. In one embodiment, the weight of the jig head 304 is an increment of 0.015625 oz. In one embodiment, the weight of the jig head 304 is an increment of 0.0625 oz. In one embodiment, the weight of the jig head 304 is an increment of 0.125 oz. In one embodiment, the weight of the jig head 134 is an increment of 0.25 oz. In one embodiment, the weight of the jig head 304 is an increment of 0.5 oz.

In one embodiment, the hook tail 302 is crafted with a substantially conical shape, featuring a rounded tip where the fishing hook 310 emerges. This conical form not only enhances the aesthetic appeal but also serves a functional purpose by minimizing water resistance, allowing for smoother maneuverability through aquatic environments. The base side of the conical hook tail 302 accommodates the threaded attachment post 306, providing a stable and streamlined foundation for the interchangeable components. Complementing the hook tail 302, the jig head 304 assumes the form of a half-cut ellipsoid, with the flat side for mounting. On this flat side, a threaded post receptacle is either cut into or placed, forming a mating integration point with the hook tail 302. When the jig head 304 and hook tail 302 are threaded together, the resulting assembly mimics the silhouette of a smaller bait fish or bug. This ability to adjust to the ideal bait for the situation provides a versatile tool for anglers seeking to optimize their catch. In one embodiment, the threaded post receptacle is a metal threaded insert that is integrated into jig head 304 via heat and/or pressure. In another embodiment, the hook tail 302 ends with a flat surface to which the fishing hook 310 is attached. In another embodiment, a corkscrew 314 emerges from the flat surface of the hook tail 302, and the corkscrew 314 wraps around the base of the fishing hook 310. In one embodiment, the corkscrew 314 is detachable from the hook tail 302. Designed with a flat surface, the hook tail 302 is easier to manufacture, visually indicates an easy stop for the user during assembly, provides for a stop to prevent overturning of the components, and is less likely to dent if the user drops the lure, which would compromise the ease of future assembly.

In one embodiment, the jig head 304 includes one or more locking bumps that protrude from the flat side of the jig head 304 around the threaded post receptacle and correspond to one or more indentions on the tail hook 302 around the base of the threaded attachment post 306. These locking bumps make sure that the jig head twists into the correct alignment and ensures that the jig head does not rotate off the tail hook 302 when it is not intended by the user. In another embodiment, the jig head 304 introduces a magnetic locking mechanism for heightened stability. Specifically, one or more magnets are strategically positioned along the edge of the jig head 304 flat surface around the thread post receptacle, complementing corresponding magnets on the tail hook 302. This magnetic alignment secures the jig head 304 in place, requiring a substantial force to disengage. This configuration not only prevents rotational movement but also ensures a reliable and durable connection, minimizing the risk of unintentional detachment during fishing activities.

Figure 10:
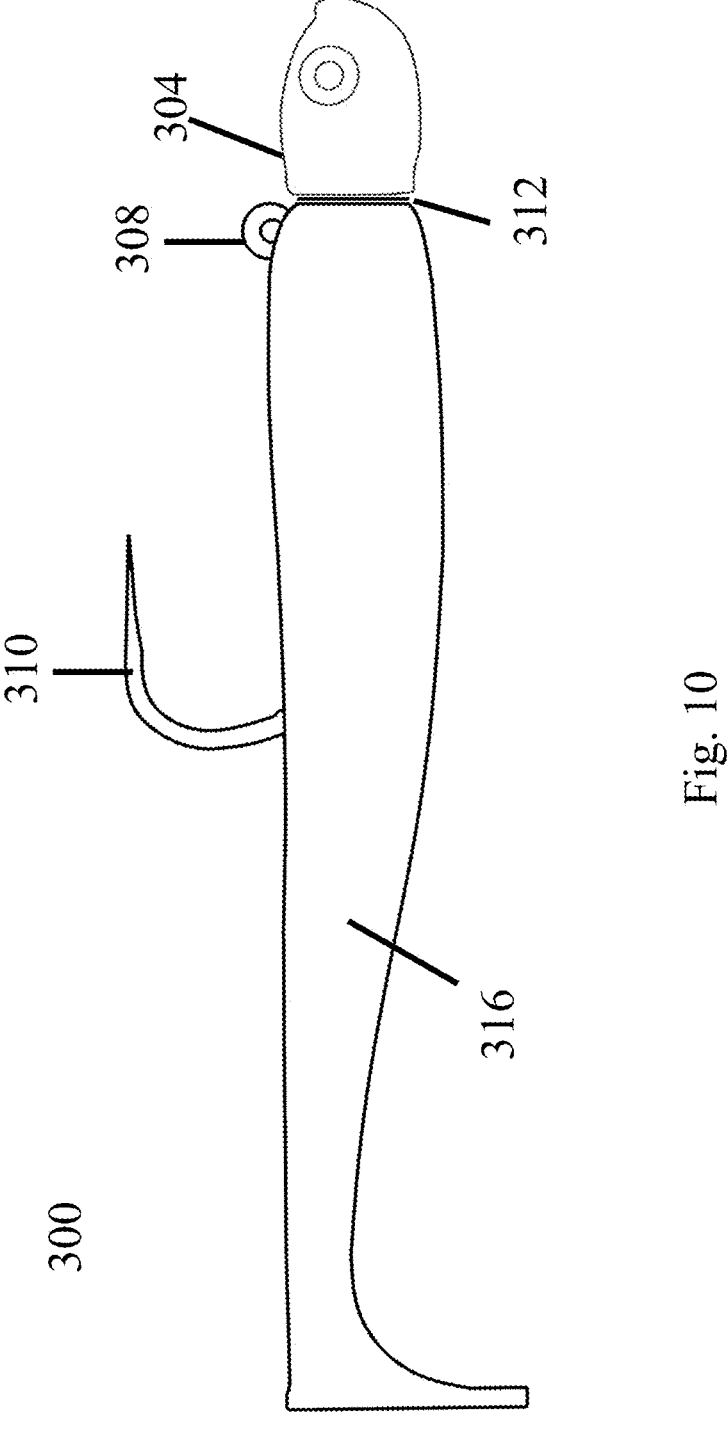
FIG. 10 illustrates a side view of the fishing jig with a soft lure fully assembled according to another embodiment of the present invention.

FIG. 10 illustrates a side view of the fishing jig with a soft lure fully assembled. The modularity of the fishing jig 300 allows the user to switch between various jig heads based on the conditions and type of fish the user is targeting without having to retie the fishing line. The variation of different jig heads could vary in size, shape, color, weight, material, texture, and/or density. All of these variations are able to be switched in and out with the screw-on/screw-off mechanism. In a preferred embodiment, the jig head 304 features a visually engaging detail, such as one or more eyes intricately painted or attached onto its face. This aesthetic feature serves a dual purpose, enhancing the overall appeal of the fishing jig 300 and emulating the anatomical characteristics of prey, thereby enticing predatory fish. Further refinements in jig head design encompass specialized textures or reflective surfaces to augment the visual mimicry, presenting an innovative approach to enhancing the jig's effectiveness in attracting and engaging target fish species. This adaptability enables anglers to strategically configure the fishing jig 300 based on the target species, environmental conditions, and desired presentation in the water.

In one embodiment, the jig head 304 and hook tail 302 are attached via magnets instead of a screw-lock mechanism. Specifically, one or more magnets are in the jig head 304 and hook tail 302, wherein the one or more magnets are strategically positioned to be located where the jig head 304 and hook tail 302 interface. Magnets used in the present invention are operable to include neodymium magnets as well as any other compact, high-strength magnets known in the art.

Certain modifications and improvements will occur to those skilled in the art upon a reading of the foregoing description. The above-mentioned examples are provided to serve the purpose of clarifying the aspects of the invention and it will be apparent to one skilled in the art that they do not serve to limit the scope of the invention. All modifications and improvements have been deleted herein for the sake of conciseness and readability but are properly within the scope of the present invention.

The invention claimed is:

1. A modular fishing jig, comprising:
a jig head, a hook tail, and a rubber ring;
wherein the hook tail includes a threaded attachment post;
wherein the jig head includes one opening;
wherein the jig head includes a threaded post receptacle, wherein the one opening of the jig head is an entrance of the threaded post receptacle, wherein the threaded attachment post is operable to be inserted through the one opening of the jig head, wherein threads of the threaded post receptacle complement threads of the threaded attachment post to provide for frictional engagement of the jig head with the hook tail, and wherein the threaded post receptacle and the threaded attachment post are form-fitting, and the threaded attachment post sits flush within an interior of the threaded post receptacle when the threads of the threaded post receptacle and the threaded attachment post are fully engaged and bottomed out;
wherein the rubber ring is secured at a base of the threaded attachment post;
wherein the jig head is operable to screw on and screw off of the hook tail;
wherein a fishing hook protrudes from and is attached to the hook tail;
wherein the fishing hook is a single hook or a treble hook;
wherein the fishing hook is formed from a marine grade metal;
wherein the hook tail includes a rigid loop permanently attached to a main body of the hook tail, wherein the rigid loop is operable to receive a fishing line,
wherein the rigid loop solely extends from the hook tail, and wherein the rigid loop comprises plastic and/or fiber reinforced composite;
wherein the threaded attachment post extends from the main body of the hook tail;
wherein when the threads of the threaded post receptacle and the threaded attachment post are fully engaged and bottomed out, an entirety of the main body of the hook tail is positioned to one side of the jig head; and
wherein the jig head weighs between 0.125 oz and 15 oz.

2. The modular fishing jig of claim 1, wherein the jig head is substantially a semi-ellipsoid with spheres representing eyes.

3. The modular fishing jig of claim 1, wherein the jig head faces up and in line with respect to the main body of the hook tail after the jig head is screwed onto the hook tail after multiple full turns.

4. The modular fishing jig of claim 1, wherein the hook tail is comprised of at least lead.

5. The modular fishing jig of claim 1, wherein the rigid loop is perpendicular to a length of the modular fishing jig for easy knot tying of the fishing line.

6. The modular fishing jig of claim 1, further comprising a second jig head, wherein the second jig head is a different weight than the jig head, wherein the second jig head includes a second threaded post receptacle configured to engage with the threaded attachment post of the hook tail.

7. The modular fishing jig of claim 1, further comprising a corkscrew component extending from the main body of the hook tail which wraps around a portion of a shank of the hook.

8. A modular fishing jig, comprising:
a jig head, a hook tail, and a rubber ring;
wherein the jig head includes one opening;
wherein the one opening is in a flat surface of the jig head, and wherein the flat surface constitutes a base side of the jig head;
wherein the rubber ring creates a waterproof seal between the jig head and the hook tail when assembled;
wherein the hook tail includes a threaded attachment post, wherein the jig head includes a compatible threaded post receptacle, wherein the one opening of the jig head is an entrance of the compatible threaded post receptacle, and wherein the threaded attachment post is operable to be inserted through the one opening of the jig head;
wherein the compatible threaded post receptacle and the threaded attachment post lock together after being rotated in a first direction;
wherein the hook tail includes a fishing hook;
wherein the fishing hook is a single hook or a treble hook;
wherein the fishing hook is formed from a marine grade metal;
wherein the hook tail includes a rigid loop positioned at a top surface of a main body of the hook tail and permanently attached to the main body of the hook tail, wherein the rigid loop solely extends from the hook tail, and wherein the rigid loop comprises plastic and/or fiber reinforced composite;
wherein the threaded attachment post extends from the main body of the hook tail;
wherein the main body of the hook tail includes a flat portion from which the threaded attachment post extends;
wherein when the jig head and the hook tail are fully engaged, an entirety of the main body of the hook tail is positioned to one side of the jig head;
wherein when threads of the threaded post receptacle and the threaded attachment post are fully engaged and bottomed out, the flat portion of the main body of the hook tail is parallel with the flat surface of the base side of the jig head;
wherein the jig head is operable to be unlocked and removed from the hook tail by rotating the jig head in a second direction.

9. The modular fishing jig of claim 8, wherein the jig head weighs between 0.015625 oz and 15 oz.

10. The modular fishing jig of claim 8, wherein the fishing hook includes at least one barb to prevent the fishing hook from falling out of a fish when hooked.

11. The modular fishing jig of claim 8, wherein the rubber ring is located at a base of the threaded attachment post.

12. The modular fishing jig of claim 8, wherein the threaded post receptacle is cut into the jig head.

13. The modular fishing jig of claim 8, wherein the threads of the threaded attachment post are made to bottom out, leading to the jig head to be oriented facing up and in line with respect to the hook tail and the rigid loop.

14. A modular fishing jig, consisting of:
a jig head, a hook tail, and a rubber ring;
wherein the hook tail includes a threaded attachment post;
wherein the jig head includes one opening;
wherein the one opening is in a flat surface of the jig head, and wherein the flat surface constitutes a base side of the jig head;
wherein the jig head includes a threaded post receptacle, wherein the one opening of the jig head is an entrance of the threaded post receptacle, wherein the threaded attachment post is operable to be inserted through the one opening of the jig head, wherein threads of the threaded post receptacle complement threads of the threaded attachment post to provide for frictional engagement of the jig head with the hook tail, and wherein the threaded attachment post sits flush within an interior of the threaded post receptacle when the threaded attachment post is threaded in the threaded post receptacle and when the threads of the threaded post receptacle and the threaded attachment post are fully engaged and bottomed out;

wherein the jig head is operable to screw on and screw off of the hook tail;

wherein a fishing hook protrudes from and is attached to the hook tail;

wherein the fishing hook is a single hook or a treble hook;

wherein the hook tail includes a rigid loop permanently attached to a main body of the hook tail, wherein the rigid loop is operable to receive a fishing line, wherein the rigid loop solely extends from the hook tail;

wherein the hook tail includes a corkscrew attached to a base of the hook tail, wherein the corkscrew wraps around the fishing hook;

wherein the threaded attachment post extends from the main body of the hook tail;

wherein when the threads of the threaded post receptacle and the threaded attachment post are fully engaged and bottomed out, an entirety of the main body of the hook tail is positioned to one side of the jig head; and wherein the jig head weighs between 0.125 oz and 15 oz.

15. The modular fishing jig of claim 14, wherein an angle of the rigid loop to the main body of the hook tail is acute.

16. The modular fishing jig of claim 14, wherein when the jig head and the hook tail are fully engaged, a flat portion of the main body of the hook tail is parallel with the flat surface of the base side of the jig head.

\*   \*   \*   \*   \*